(12) United States Patent
Morooka

(10) Patent No.: US 11,230,619 B2
(45) Date of Patent: Jan. 25, 2022

(54) CURABLE COMPOSITION, CURED PRODUCT, OPTICAL MEMBER, LENS, AND METHOD FOR PRODUCING CURED PRODUCT

(71) Applicant: FUJIFILM Corporation, Tokyo (JP)

(72) Inventor: Naoyuki Morooka, Ashigarakami (JP)

(73) Assignee: FUJIFILM Corporation, Tokyo (JP)

( * ) Notice: Subject to any disclaimer, the term of this patent is extended or adjusted under 35 U.S.C. 154(b) by 241 days.

(21) Appl. No.: 16/371,715

(22) Filed: Apr. 1, 2019

(65) Prior Publication Data

US 2019/0233563 A1    Aug. 1, 2019

Related U.S. Application Data

(63) Continuation of application No. PCT/JP2017/031506, filed on Sep. 1, 2017.

(30) Foreign Application Priority Data

Oct. 3, 2016 (JP) .............................. JP2016-195776

(51) Int. Cl.

| | | |
|---|---|---|
| C08F 220/18 | (2006.01) | |
| G02B 1/04 | (2006.01) | |
| C08K 5/523 | (2006.01) | |
| C08K 3/20 | (2006.01) | |
| C08F 212/36 | (2006.01) | |
| C08F 220/30 | (2006.01) | |
| C08F 212/08 | (2006.01) | |
| C08K 5/01 | (2006.01) | |
| C08L 33/06 | (2006.01) | |
| C08F 220/10 | (2006.01) | |
| C08K 5/521 | (2006.01) | |
| C08K 5/14 | (2006.01) | |

(52) U.S. Cl.
CPC .......... *C08F 220/18* (2013.01); *C08F 212/08* (2013.01); *C08F 212/36* (2013.01); *C08F 220/10* (2013.01); *C08F 220/30* (2013.01); *C08K 3/20* (2013.01); *C08K 5/01* (2013.01); *C08K 5/521* (2013.01); *C08K 5/523* (2013.01); *C08L 33/06* (2013.01); *G02B 1/04* (2013.01); *G02B 1/041* (2013.01); *C08K 5/14* (2013.01)

(58) Field of Classification Search
CPC .... C08F 220/18; C08F 212/36; C08F 220/30; G02B 1/041; C08K 5/523; C08K 3/20; C08K 5/521
USPC ........................................................ 524/271
See application file for complete search history.

(56) References Cited

U.S. PATENT DOCUMENTS

| | | | |
|---|---|---|---|
| 2005/0100722 A1 | 5/2005 | Kitamura et al. | |
| 2013/0237630 A1* | 9/2013 | Morooka | G02B 1/04 |
| | | | 522/182 |
| 2014/0200323 A1* | 7/2014 | Itoh | C08G 18/3876 |
| | | | 528/67 |
| 2015/0197592 A1 | 7/2015 | Someya et al. | |
| 2016/0160006 A1 | 6/2016 | Morooka | |

FOREIGN PATENT DOCUMENTS

| | | | |
|---|---|---|---|
| JP | 2006-182939 A | | 7/2006 |
| JP | 2009-126011 A | | 6/2009 |
| JP | 2010-031240 | * | 2/2010 |
| JP | 2010-031240 A | | 2/2010 |
| JP | 2014-080572 A | | 5/2014 |
| JP | 2015-057462 A | | 3/2015 |
| JP | 2016-098248 A | | 5/2016 |
| WO | 01/40828 A1 | | 6/2001 |

OTHER PUBLICATIONS

Machine translation of JP 2010-031240 (Year: 2010).*
International Search Report dated Nov. 14, 2017 from the International Searching Authority in counterpart International Application No. PCT/JP2017/031506.
International Preliminary Report on Patentability dated Apr. 9, 2019 from the International Bureau in counterpart with International Application No. PCT/JP2017/031506.
Written Opinion dated Nov. 14, 2017 from the International Searching Authority in counterpart International Application No. PCT/JP2017/031506.
Hughes, R. E. et al., "Total Synthesis of d,I-Caryophyllene and d,I-Isocaryophyllene", Department of Chemistry, J. Am. Chem. Soc., vol. 85, Feb. 5, 1963, pp. 362-363.
McMurry, John E. et al., "Synthesis of Isocaryophyllene By Titanium-Induced Keto Ester Cyclization", Tetrahedron Letters, vol. 24, No. 18, 1983, pp. 1885-1888.
Communication dated Mar. 3, 2020, from the Japanese Patent Office in Application No. 2018-543784.

* cited by examiner

*Primary Examiner* — Doris L Lee
(74) *Attorney, Agent, or Firm* — Sughrue Mion, PLLC

(57) ABSTRACT

A curable composition contains: a cardo skeleton-containing monomer having two or more (meth)acryloyl groups in a molecule; an aromatic ring-containing monofunctional (meth)acrylate monomer; and an acidic phosphate ester, in which the acidic phosphate ester is a compound represented by General Formula (1), and the content of the acidic phosphate ester is 0.003% to 1% by mass with respect to a total mass of the curable composition.

General Formula (1)

$$\text{HO}-\underset{\underset{\text{OR}^1}{|}}{\overset{\overset{\text{O}}{\|}}{\text{P}}}-\text{OR}^2$$

14 Claims, No Drawings

CURABLE COMPOSITION, CURED PRODUCT, OPTICAL MEMBER, LENS, AND METHOD FOR PRODUCING CURED PRODUCT

CROSS-REFERENCE TO RELATED APPLICATIONS

This application is a Continuation of PCT International Application No. PCT/JP2017/031506, filed on Sep. 1, 2017, which claims priority under 35 U.S.C. § 119(a) to Japanese Patent Application No. 2016-195776, filed on Oct. 3, 2016. Each of the above application(s) is hereby expressly incorporated by reference, in its entirety, into the present application.

BACKGROUND OF THE INVENTION

1. Field of the Invention

The present invention relates to a curable composition, a cured product, an optical member, a lens, and a method for producing a cured product.

2. Description of the Related Art

Conventionally, a glass material has been used for an optical member of an imaging module such as a camera, a video camera, a mobile phone with a camera, a video phone, or a door phone with a camera. The glass material has been preferably used since it has various optical properties and excellent environmental resistance. However, the glass material has a disadvantage in that weight reduction and miniaturization are not easy and workability or productivity is poor. In contrast, since a resin cured product can be produced in a massive amount and has excellent workability, the resin cured product has recently been used in various optical members.

In general, a resin cured product is molded by charging a curable composition into a mold for molding and curing the composition. Therefore, the curable composition used for optical members is required to have good moldability in addition to exhibiting excellent optical properties after curing. For example, JP2015-057462A discloses a curable composition including an alicyclic (meth)acrylate monomer having two or more (meth)acryloyl groups in a molecule, a polymer having a radically polymerizable group in a side chain, a non-conjugated vinylidene group-containing compound, and a phosphate ester. JP2015-057462A aims to obtain a curable composition having excellent mold transferability and excellent mold releasability.

In recent years, along with the miniaturization of an imaging module, it has been required to downsize an optical member used in the imaging module. However, miniaturization of the optical member brings about a problem associated with the chromatic aberration. In an optical member using a resin cured product, it has been studied to correct chromatic aberration by decreasing the Abbe number through the addition of various additives to a curable composition to thereby change post-curing properties thereof. For example, JP2016-098248A discloses a curable composition including a (meth)acrylate having a fluorene skeleton, a phenylphenoxyethyl (meth)acrylate, and a polymerization initiator. In JP2016-098248A, (meth)acrylate having a fluorene skeleton or the like is used, and studies are being made to increase optical properties of a cured product to be molded thereby.

SUMMARY OF THE INVENTION

However, in JP2015-057462A, a curable composition having excellent mold transferability and excellent mold releasability has been obtained, but the cured product molded from the curable composition has a high Abbe number and the application of the cured product is limited in some cases. JP2016-098248A has a problem that it is difficult to achieve high precision of the surface shape of a cured product due to poor mold transferability, even though the Abbe number of the cured product can be suppressed to a certain extent.

Therefore, in order to solve such problems of the related art, the present inventors have conducted studies with a view to providing a curable composition from which a cured product having a low Abbe number can be molded and which has excellent mold transferability. In addition, the present inventors have also studied for the purpose of enhancing the continuous moldability in a case of continuously molding a cured product.

As a result of extensive studies to solve the foregoing problems, the present inventors have found that a curable composition from which a cured product having a low Abbe number can be molded and which has both excellent mold transferability and excellent continuous moldability is obtained by adding a predetermined amount of an acidic phosphate ester having a specific structure to a curable composition including a cardo skeleton-containing monomer and an aromatic ring-containing monofunctional (meth)acrylate monomer.

Specifically, the present invention has the following configuration.

[1] A curable composition comprising:

a cardo skeleton-containing monomer having two or more (meth)acryloyl groups in a molecule;

an aromatic ring-containing monofunctional (meth)acrylate monomer; and an acidic phosphate ester, in which the acidic phosphate ester is a compound represented by General Formula (1), and the content of the acidic phosphate ester is 0.003% to 1% by mass with respect to a total mass of the curable composition;

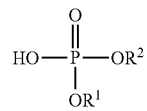

General Formula (1)

in General Formula (1), $R^1$ and $R^2$ may be the same as or different from each other and each independently represent a hydrogen atom or an alkyl group which may have a substituent; and at least one selected from $R^1$ or $R^2$ is an alkyl group which may have a substituent.

[2] The curable composition according to [1], in which, in General Formula (1), the alkyl group which may have a substituent has less than 10 carbon atoms.

[3] The curable composition according to [1] or [2], further comprising:
an aromatic ring-containing acidic phosphate ester represented by General Formula (2);

General Formula (2)

in General Formula (2), $Ar^1$ and $Ar^2$ may be the same as or different from each other and each independently represent a hydrogen atom or an aryl group which may have a substituent; and at least one selected from $Ar^1$ or $Ar^2$ is an aryl group which may have a substituent.

[4] The curable composition according to [3], in which the content of the acidic phosphate ester and the content of the aromatic ring-containing acidic phosphate ester are 50:50 to 10:90 in terms of mass ratio.

[5] The curable composition according to any one of [1] to [4], in which the content of the cardo skeleton-containing monomer is 30% to 90% by mass with respect to the total mass of the curable composition, the curable composition further comprises a polymer having a radically polymerizable group in a side chain, and the content of the polymer is 0% to 40% by mass with respect to the total mass of the curable composition.

[6] The curable composition according to any one of [1] to [5], further comprising:
at least one initiator selected from the group consisting of a thermal radical polymerization initiator and a photoradical polymerization initiator.

[7] The curable composition according to any one of [1] to [6], further comprising: a hydroperoxide compound.

[8] The curable composition according to any one of [1] to [7], further comprising:
a non-conjugated vinylidene group-containing compound.

[9] A cured product of the curable composition according to any one of [1] to [8].

[10] An optical member comprising:
the cured product according to [9].

[11] A lens comprising:
the cured product according to [9].

[12] A method for producing a cured product, the method comprising in order:
pressing a mold against the curable composition according to any one of [1] to [8];
irradiating the curable composition with light to obtain a semi-cured product;
thermally curing the semi-cured product at a temperature of 150° C. or higher to form a cured product; and
separating the mold from the cured product in a temperature range of 150° C. to 250° C.

[13] The method for producing a cured product according to [12], in which the mold is subjected to a chromium nitride treatment.

According to the present invention, it is possible to obtain a curable composition from which a cured product having a low Abbe number can be molded and which has both excellent mold transferability and excellent continuous moldability. A cured product formed from the curable composition of the present invention is preferably used as an optical member.

DESCRIPTION OF THE PREFERRED EMBODIMENTS

Hereinafter, the present invention will be described in detail. The description of constituent elements described below may be made based on representative embodiments and specific examples, but the present invention is not limited to such embodiments. Numerical ranges expressed using "to" in the present specification mean a range including numerical values described before and after "to" as a lower limit value and an upper limit value, respectively.

In the present specification, the term "(meth)acrylate" refers to acrylate and methacrylate, and the term "(meth)acryloyl" refers to acryloyl and methacryloyl. The monomer in the present invention is a compound distinguished from an oligomer and a polymer and having a weight-average molecular weight of 1,000 or less.

In the indication of a group (atomic group) in the present specification, the indication not including substitution or unsubstitution includes those having a substituent as well as those not having a substituent. For example, the term "alkyl group" includes not only an alkyl group not having a substituent (unsubstituted alkyl group) but also an alkyl group having a substituent (substituted alkyl group).

Curable Composition

The present invention relates to a curable composition containing a cardo skeleton-containing monomer having two or more (meth)acryloyl groups in a molecule, an aromatic ring-containing monofunctional (meth)acrylate monomer, and an acidic phosphate ester. Here, the acidic phosphate ester is a compound represented by General Formula (1), and the content of the acidic phosphate ester is 0.003% to 1% by mass with respect to the total mass of the curable composition.

General Formula (1)

In General Formula (1), $R^1$ and $R^2$ may be the same as or different from each other and each independently represent a hydrogen atom or an alkyl group which may have a substituent. At least one selected from $R^1$ or $R^2$ is an alkyl group which may have a substituent.

Since the curable composition according to the embodiment of the present invention contains the predetermined components as described above, a cured product having a low Abbe number can be molded. Further, since the curable composition according to the embodiment of the present invention contains a predetermined amount of an acidic phosphate ester having a specific structure, the composition has excellent mold transferability and excellent continuous moldability. Since the curable composition according to the embodiment of the present invention has excellent mold transferability, the surface properties of the cured product obtained by molding the curable composition are satisfactory. Specifically, the occurrence of fine irregularities (wrinkles) on the surface of the cured product is suppressed. Therefore, in a case where the curable composition according to the embodiment of the present invention is used, a cured product of high quality can be obtained. In addition, since the curable composition according to the embodiment of the present invention is excellent also in continuous moldability, it is possible to continuously mold cured product with less variation in shape. In a case where the curable composition according to the embodiment of the present invention is used, the production efficiency of the cured product can also be improved.

The viscosity of the curable composition according to the embodiment of the present invention is preferably 1000 mPa·s or more, more preferably 2000 mPa·s or more, still more preferably 3000 mPa·s or more, even more preferably 4000 mPa·s or more, and particularly preferably 5000 mPa·s or more. The viscosity of the curable composition is preferably 20000 mPa·s or less, more preferably 15000 mPa·s or less, still more preferably 13000 mPa·s or less, and particularly preferably 10000 mPa·s or less. Setting the viscosity of the curable composition within the above range makes it possible to improve the moldability in a case of molding the cured product from the curable composition.

Hereinafter, individual components constituting the curable composition according to the embodiment of the present invention will be described.

Cardo Skeleton-Containing Monomer (A)

The curable composition according to the embodiment of the present invention contains a cardo skeleton-containing monomer (A) having two or more (meth)acryloyl groups in a molecule. The cardo skeleton-containing monomer (A) having two or more (meth)acryloyl groups in a molecule is preferably a compound represented by General Formula (A).

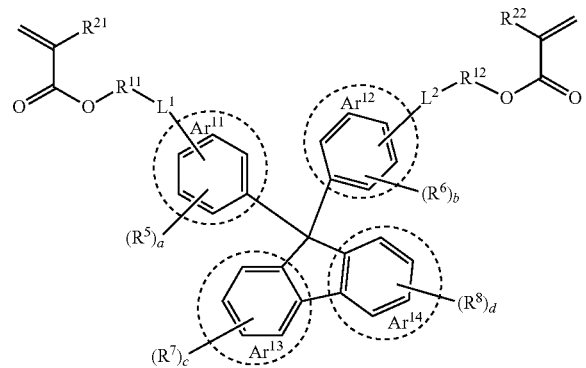

General Formula (A)

In General Formula (A), $Ar^{11}$ to $Ar^{14}$ each independently represent an aryl group containing a benzene ring surrounded by a broken line or a heteroaryl group containing a benzene ring surrounded by a broken line. $R^5$ to $R^8$ each independently represent a substituent. a to d each independently represent an integer of 0 to 4.

$L^1$ and $L^2$ each independently represent a single bond, an oxygen atom, or a sulfur atom, and $R^{11}$ and $R^{12}$ each independently represent a linking group containing at least one selected from an ether bond, an ester bond, a thioether bond, a thioester bond, an amide bond, a carbonate bond or an alkylene group, or a single bond, and $R^{21}$ and $R^{22}$ each independently represent a hydrogen atom or a methyl group.

In a case where $Ar^{11}$ and $Ar^{12}$ are each independently an aromatic fused ring group containing a benzene ring surrounded by a broken line as one of fused rings, a group having $L^1$ as a linking group, a group having $L^2$ as a linking group, $R^5$, and $R^6$ may each independently be substituted with a benzene ring surrounded by a broken line or may each independently be substituted with a fused ring other than the benzene ring surrounded by a broken line. In a case where $Ar^{13}$ and $Ar^{14}$ are each independently an aromatic fused ring group containing a benzene ring surrounded by a broken line as one of fused rings, $R^7$ and $R^8$ may each independently be substituted with a benzene ring surrounded by a broken line or may each independently be substituted with a fused ring other than the benzene ring surrounded by a broken line.

In General Formula (A), $Ar^{11}$ to $Ar^{14}$ each independently represent an aryl group containing a benzene ring surrounded by a broken line or a heteroaryl group containing a benzene ring surrounded by a broken line. Above all, $Ar^{11}$ to $Ar^{14}$ are each independently preferably an aryl group containing a benzene ring surrounded by a broken line. In a case where $Ar^{11}$ to $Ar^{14}$ are each an aryl group containing a benzene ring surrounded by a broken line, an aryl group having 6 to 18 carbon atoms is preferable, an aryl group having 6 to 14 carbon atoms is more preferable, and an aryl group having 6 to 10 carbon atoms is still more preferable. In a case where $Ar^{11}$ to $Ar^{14}$ are each a heteroaryl group containing a benzene ring surrounded by a broken line, a heteroaryl group having 9 to 14 ring members is preferable, and a heteroaryl group having 9 to 10 ring members is more preferable. In a case where $Ar^{11}$ to $Ar^{14}$ constitute a heteroaryl group which may have a substituent, examples of the heteroatom include a nitrogen atom, an oxygen atom, and a sulfur atom.

$Ar^{11}$ to $Ar^{14}$ may each independently be an aryl group constituted only by a benzene ring surrounded by a broken line or an aromatic fused ring group containing a benzene ring surrounded by a broken line as one of fused rings. Above all, $Ar^{11}$ to $Ar^{13}$ are each independently preferably an aryl group constituted only by a benzene ring surrounded by a broken line. $Ar^{14}$ may be an aryl group constituted only by a benzene ring surrounded by a broken line or an aromatic fused ring group containing a benzene ring surrounded by a broken line as one of fused rings, any aspect of which is a preferred aspect. In a case where $Ar^{14}$ is an aryl group constituted only by a benzene ring surrounded by a broken line, it is easy to synthesize the cardo skeleton-containing monomer (A) represented by General Formula (A), and it is possible to increase the production efficiency of the curable composition and to enhance the cost competitiveness. Further, in a case where $Ar^{14}$ is an aromatic fused ring group containing a benzene ring surrounded by a broken line as one of fused rings, the viscosity of the curable composition can be increased, so that a curable composition having a viscosity suitable for molding can be obtained even with a reduced addition amount of a polymer having a radically polymerizable group in the side chain, which will be described later, or even without adding the polymer having a radically polymerizable group in the side chain. Further, it is possible to reduce the Abbe number of the cured product formed from the curable composition. In a case where $Ar^{14}$ is an aromatic fused ring group containing a benzene ring surrounded by a broken line as one of fused rings, the aromatic fused ring group represented by $Ar^{14}$ is preferably an aryl group having 9 or 10 carbon atoms and more preferably a naphthyl group.

In General Formula (A), $R^5$ to $R^8$ each independently represent a substituent. The substituent represented by $R^5$ to $R^8$ is not particularly limited, and examples thereof include a halogen atom, a halogenated alkyl group, an alkyl group, an alkenyl group, an acyl group, a hydroxy group, a hydroxyalkyl group, an alkoxy group, an aryl group, a heteroaryl group, and an alicyclic group. The substituent represented by $R^5$ to $R^8$ is preferably an alkyl group, an alkoxy group, or an aryl group, more preferably an alkyl group having 1 to 5 carbon atoms, an alkoxy group having 1 to 5 carbon atoms, or a phenyl group, and particularly preferably a methyl group, a methoxy group, or a phenyl group. In General Formula (A), in a case where $Ar^{11}$ and $Ar^{12}$ are each independently an aromatic fused ring group containing a benzene ring surrounded by a broken line as one of the fused rings, $R^5$ and $R^6$ may each independently be substituted with a benzene ring surrounded by a broken line or may each independently be substituted with a fused ring other than the benzene ring surrounded by a broken line. Similarly, in a case where $Ar^{13}$ and $Ar^{14}$ are each independently an aromatic fused ring group containing a benzene ring surrounded by a broken line as one of fused rings, $R^7$ and $R^8$ may each independently be substituted with a benzene ring surrounded by a broken line or may each independently be substituted with a fused ring other than the benzene ring surrounded by a broken line.

In General Formula (A), a to d are each independently an integer of 0 to 4, preferably an integer of 0 to 3, and more preferably an integer of 0 to 2. For example, it is also preferred that c is 1 or 2 and a, b, and d are each 0, and it is also preferred that c is 2 and a, b, and d are each 0. In addition, a to d may be each 0 or all of a to d may be 0.

In General Formula (A), $L^1$ and $L^2$ each independently represent a single bond, an oxygen atom, or a sulfur atom. $L^1$ and $L^2$ are each independently preferably an oxygen atom or a sulfur atom and more preferably an oxygen atom.

In General Formula (A), $R^{11}$ and $R^{12}$ each independently represent a linking group containing at least one selected from an ether bond, an ester bond, a thioether bond, a thioester bond, an amide bond, a carbonate bond or an alkylene group, or a single bond. $R^{11}$ and $R^{12}$ are each independently preferably a linking group containing at least one selected from an ether bond, an ester bond, a carbonate bond or an alkylene group, or a single bond, and more preferably a linking group containing an alkylene group. Above all, it is particularly preferred that $R^{11}$ and $R^{12}$ are each independently a linking group including an alkylene group. In this case, the number of carbon atoms in the alkylene group is preferably 2 to 8, more preferably 2 to 6, and still more preferably 2 to 4.

In a case where $Ar^{11}$ and $Ar^{12}$ are each independently an aromatic fused ring group containing a benzene ring surrounded by a broken line as one of fused rings, the group having $L^1$ as a linking group and the group having $L^2$ as a linking group may each independently be substituted with a benzene ring surrounded by a broken line or may each independently be substituted with a fused ring other than benzene ring surrounded by a broken line.

In General Formula (A), $R^{21}$ and $R^{22}$ each independently represent a hydrogen atom or a methyl group and preferably a hydrogen atom.

Specific examples of the cardo skeleton-containing monomer (A) having two or more (meth)acryloyl groups in the molecule, which is preferably used in the present invention, are listed below, but the cardo skeleton-containing monomer (A) in the present invention is not limited to the following compounds. MeO in the following structural formulae represents a methoxy group.

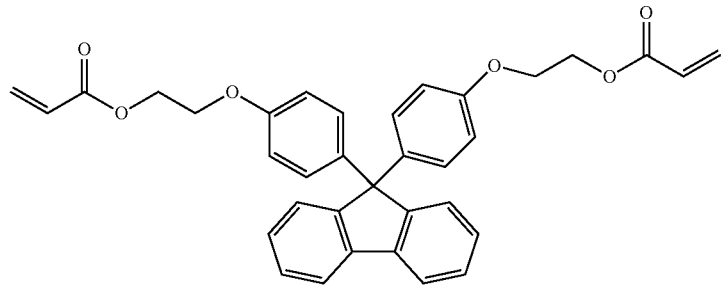

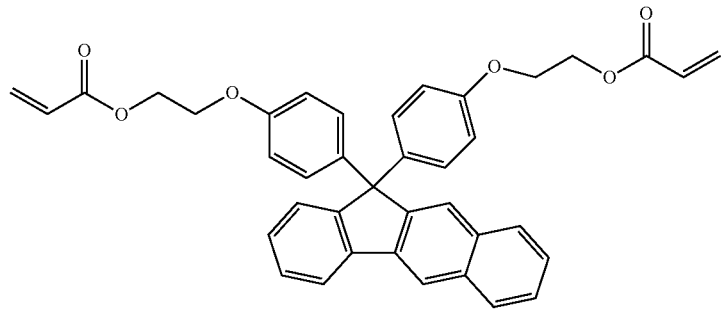

-continued
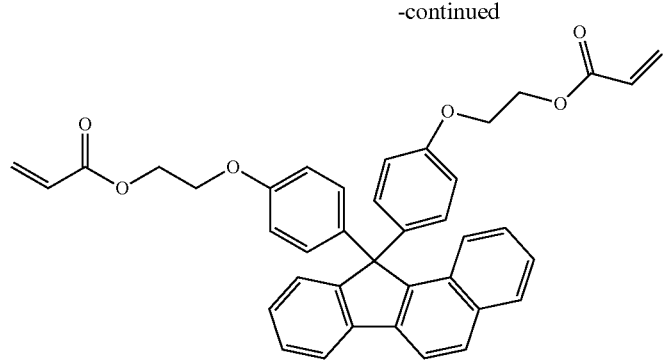
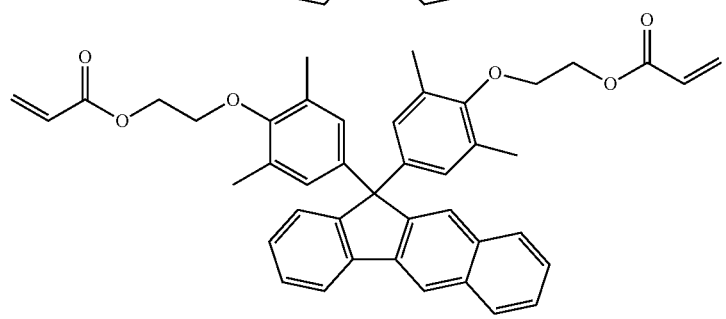
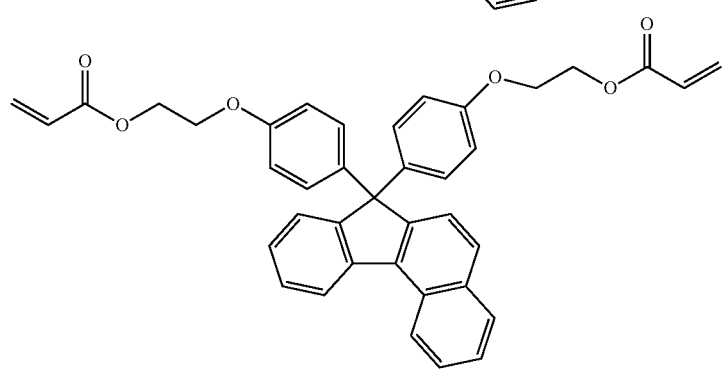
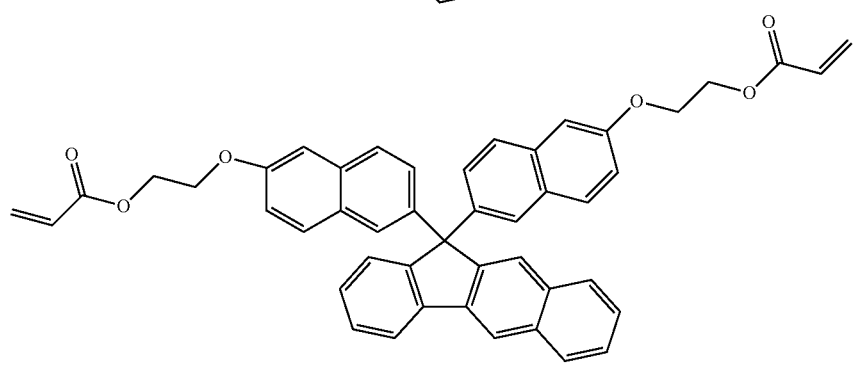
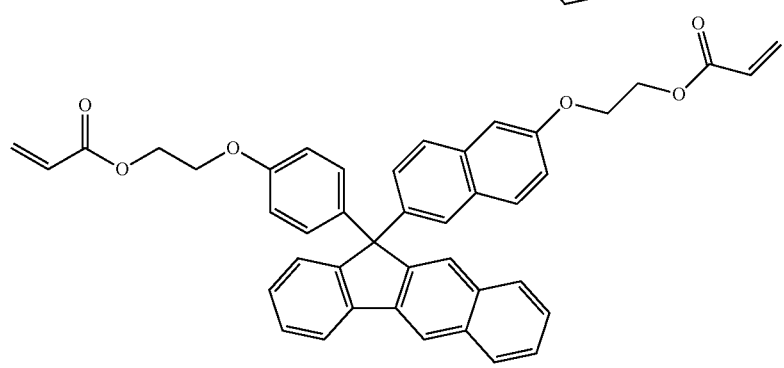

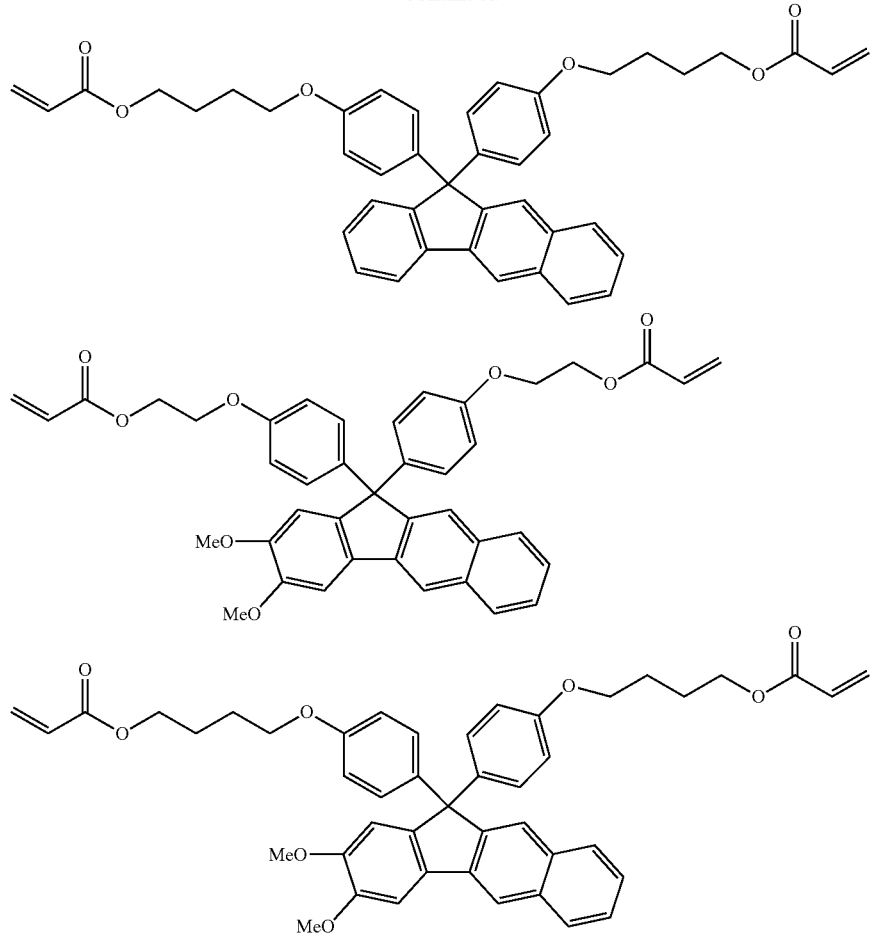

The molecular weight of the compound represented by General Formula (A) is preferably 400 to 1000, more preferably 500 to 900, and particularly preferably 550 to 800.

The method of obtaining these compounds represented by General Formula (A) is not particularly limited, and the compounds may be commercially available or may be produced by synthesis. In a case of production by synthesis, the method for producing the compound represented by General Formula (A) is not particularly limited and the compound can be synthesized by known methods and methods described in the Examples.

The content of the compound represented by General Formula (A) in the curable composition is preferably 20% to 94% by mass, more preferably 30% to 90% by mass, and still more preferably 40% to 85% by mass.

Aromatic Ring-Containing Monofunctional (Meth)Acrylate Monomer (B)

The curable composition according to the embodiment of the present invention contains an aromatic ring-containing monofunctional (meth)acrylate monomer (B). Here, the fact that the (meth)acrylate monomer is monofunctional means that it has one (meth)acryloyl group in the molecule.

The viscosity of the aromatic ring-containing monofunctional (meth)acrylate monomer (B) at 25° C. is preferably less than 2000 mPa·s. The viscosity of the aromatic ring-containing monofunctional (meth)acrylate monomer (B) at 25° C. is more preferably less than 1500 mPa·s, still more preferably less than 1000 mPa·s, even more preferably less than 500 mPa·s, and particularly preferably less than 200 mPa·s. In addition, the viscosity of the aromatic ring-containing monofunctional (meth)acrylate monomer (B) at 25° C. is a value measured using a rheometer (RS600, manufactured by HAAKE GmbH) under the conditions of 25° C. and a shear rate of 10 s$^{-1}$.

The aromatic ring-containing monofunctional (meth) acrylate monomer (B) is preferably a monofunctional (meth)acrylate monomer containing an aryl group or a heteroaryl group. Above all, the aromatic ring-containing monofunctional (meth)acrylate monomer (B) is more preferably a monofunctional (meth)acrylate monomer containing an aryl group. The Abbe number of the cured product can be more effectively reduced by using such an aromatic ring-containing monofunctional (meth)acrylate monomer (B). Further, the aromatic ring-containing monofunctional (meth)acrylate monomer (B) can be easily uniformly mixed in the curable composition, so that transparency and durability of the cured product can be more effectively enhanced.

Examples of the (meth)acrylate monomer containing an aryl group or a heteroaryl group include benzyl (meth) acrylate, ethylene oxide (EO)-modified cresol (meth)acrylate, ethoxylated phenyl (meth)acrylate, nonylphenoxypolyethylene glycol (meth)acrylate, nonylphenoxy polypropylene glycol (meth)acrylate, paracumyl phenoxy-ethylene glycol (meth)acrylate, epichlorohydrin (ECH)-modified phenoxy (meth)acrylate, phenoxyethyl (meth)acrylate, phenoxydiethylene glycol (meth)acrylate, phenoxyhexaethylene glycol (meth)acrylate, phenoxytetraethylene glycol (meth)acrylate, tribromophenyl (meth)acrylate, EO-modified tribromophenyl (meth)acrylate, o-phenylphenol (meth)acrylate, o-phenylphenol EO-modified (meth)acrylate, o-phenoxybenzyl (meth)acrylate, and m-phenoxybenzyl (meth)acrylate. Among them, benzyl (meth)acrylate, phenoxyethyl (meth)acrylate, o-phenylphenol (meth)acrylate, o-phenylphenol EO-modified (meth)acrylate, o-phenoxybenzyl (meth)acrylate, m-phenoxybenzyl (meth)acrylate are more preferable, benzyl (meth)acrylate and phenoxyethyl (meth)acrylate are particularly preferable, and benzyl acrylate and phenoxyethyl acrylate are more particularly preferable.

For example, the following compounds can be listed as the aromatic ring-containing monofunctional (meth)acrylate monomer (B) which can be preferably used in the present invention.

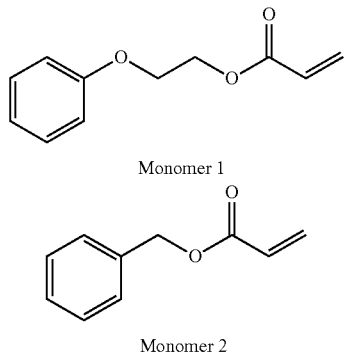

Monomer 1

Monomer 2

The method of obtaining the aromatic ring-containing monofunctional (meth)acrylate monomer (B) is not particularly limited, and the compound may be commercially available or may be produced by synthesis. In a case where the compound is commercially available, for example, VISCOAT #192 PEA (Monomer 1) (manufactured by Osaka Organic Chemical Industry Ltd.) or VISCOAT #160 BZA (Monomer 2) (manufactured by Osaka Organic Chemical industry Ltd.) may be preferably used. The viscosity of Monomer 1 at 25° C. and a shear rate of 10 s$^{-1}$ is 9 mPa·s, and the viscosity of Monomer 2 at 25° C. and a shear rate of 10 s$^{-1}$ is 8 mPa·s.

The content of the aromatic ring-containing monofunctional (meth)acrylate monomer (B) is preferably 5% to 80% by mass, more preferably 5% to 50% by mass, and still more preferably 5% to 40% by mass with respect to the total mass of the curable composition.

Non-Conjugated Vinylidene Group-Containing Compound (C)

The curable composition according to the embodiment of the present invention preferably further contains a non-conjugated vinylidene group-containing compound (C). The non-conjugated vinylidene group-containing compound (C) is preferably a non-conjugated vinylidene group-containing compound represented by General Formula (13) or General Formula (14).

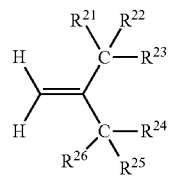

General Formula (13)

In General Formula (13), $R^{21}$ to $R^{26}$ each independently represent a substituent, at least one of $R^{21}, \ldots,$ or $R^{26}$ forms a ring, or at least two of $R^{21}$ to $R^{26}$ are bonded to each other to form a ring. However, the non-conjugated vinylidene group-containing compound represented by General Formula (13) does not contain a (meth)acryloyl group.

The substituent represented by $R^{21}$ to $R^{26}$ in General Formula (13) is not particularly limited and examples thereof include a hydrogen atom, a halogen atom, a halogenated alkyl group, an alkyl group, an alkenyl group, an acyl group, a hydroxy group, a hydroxyalkyl group, an aromatic ring group, a heteroaromatic ring group, and an alicyclic group. Among them, $R^{21}$ to $R^{26}$ are preferably a hydrogen atom, an alkyl group, or an alkenyl group, and more preferably a hydrogen atom, an alkyl group having 1 to 5 carbon atoms, or an alkenyl group having 2 to 5 carbon atoms.

The ring formed by $R^{21}$ to $R^{26}$ may be an aromatic ring or a heteroaromatic ring, and may also be a non-aromatic ring. Above all, the ring to be formed by $R^{21}$ to $R^{26}$ is preferably a non-aromatic ring and more preferably a non-aromatic hydrocarbon ring. The ring to be formed by $R^{21}$ to $R^{26}$ may further have a substituent, and for example, the substituent is preferably an alkyl group having 1 to 5 carbon atoms and more preferably a methyl group, an ethyl group, an n-propyl group, or an isopropyl group. In a case where the ring to be formed by $R^{21}$ to $R^{26}$ has additional substituents, the substituents may be bonded to each other to form a fused ring.

The non-conjugated vinylidene group-containing compound represented by General Formula (13) may have one ring or multiple rings formed by $R^{21}$ to $R^{26}$ therein. In a case where the compound has multiple rings formed by $R^{21}$ to $R^{26}$, the rings may be multiple rings independent of each other, or those independent multiple rings may be fused to form a fused ring, or in a case where one ring has additional substituents, the substituents may be bonded to each other to form a fused ring. Above all, the ring to be formed by $R^{21}$ to $R^{26}$ is more preferably a fused ring formed through fusion of multiple rings; and in a case where one ring has additional substituents, particularly preferably, the substituents are bonded to each other to form a fused ring. In this description, an aspect where two rings form a spiro-fusion is also within the scope of the concept of the fused ring here. Of the carbon atom to which $R^{21}$ and $R^{22}$ are bonded and the carbon atom to which $R^{25}$ and $R^{26}$ are bonded, one carbon atom is preferably an asymmetric carbon atom.

The non-conjugated vinylidene group-containing compound represented by General Formula (13) preferably contains a fused ring formed through fusion of 2 to 5 rings and more preferably a fused ring formed through fusion of 2 or 3 rings. In addition, the number of the ring-constituting atoms of each ring constituting the fused ring is preferably 3 to 10, more preferably 3 to 9, and particularly preferably 4 to 9.

Of $R^{21}, \ldots,$ or $R^{26}$, (A) at least one forms a ring, or (B) at least two are bonded to each other to form a ring. Of $R^{21}, \ldots,$ or $R^{26}$ in the non-conjugated vinylidene group-containing compound, case (B) is preferred where at least two are bonded to each other to form a ring. In this case, it is preferred that the non-conjugated vinylidene group-containing compound is represented by General Formula (14).

General Formula (14)

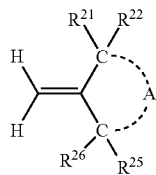

In General Formula (14), $R^{21}$, $R^{22}$, $R^{25}$, and $R^{26}$ each independently represent a substituent, and A represents an atomic group necessary for forming a cyclic structure.

In General Formula (14), the preferred ranges of substituents represented by $R^{21}$, $R^{22}$, $R^{25}$, and $R^{26}$ are the same as the preferred ranges of $R^{21}$ to $R^{26}$ in General Formula (13). In addition, $R^{21}$, $R^{22}$, $R^{25}$, and $R^{26}$ may further be bonded to one another to form a ring, and the ring may further have a substituent.

Preferably, of the pair of $R^{21}$ and $R^{22}$ or the pair of $R^{25}$ and $R^{26}$, at least one of the two substituents in any one pair alone is a hydrogen atom, and more preferably, both the two substituents in any one pair alone are hydrogen atoms.

Also preferably, $R^{21}$ and $R^{22}$ are each independently a hydrogen atom or a hydrocarbon group having 1 to 5 carbon atoms, and the hydrocarbon group having 1 to 5 carbon atoms does not form a ring. Of $R^{21}$ and $R^{22}$, preferably, one alone is a hydrogen atom or a hydrocarbon group having 1 to 5 carbon atoms, and the hydrocarbon group having 1 to 5 carbon atoms does not form a ring.

In General Formula (14), A represents an atomic group necessary for forming a cyclic structure, and the cyclic structure is not particularly limited and may be any known cyclic structure. Examples of the cyclic structure include an alicyclic ring (non-aromatic hydrocarbon ring), an aromatic ring, a heterocyclic ring, and a lactone ring containing —CO—. Of those, A is preferably an atomic group necessary for forming an alicyclic ring having 4 to 10 carbon atoms including the carbon atoms bonded to A in General Formula (14) and the carbon atom constituting the non-conjugated vinylidene group, and particularly preferably an atomic group necessary for forming an alicyclic ring having 5 to 9 carbon atoms including the carbon atoms bonding to A in General Formula (14) and the carbon atom constituting the non-conjugated vinylidene group. The alicyclic ring may have an additional substituent, and the preferred range of the substituent is the same as that of the additional substituent that the ring to be formed by $R^2$, $R^{22}$, $R^{25}$, and $R^{26}$ may have. A may be an unsaturated alicyclic ring or a saturated alicyclic ring, but it is preferred that at least one unsaturated bond is contained in the entire non-conjugated vinylidene group-containing compound represented by General Formula (14). A may further form a fused ring along with the substituent represented by $R^{21}$, $R^{22}$, $R^{25}$, and $R^{26}$.

According to the present invention, in General Formula (14), it is particularly preferred that $R^{21}$, $R^{22}$, $R^{25}$, and $R^{26}$ each independently represent a substituent consisting of only hydrogen atoms and carbon atoms, and A represents an alicyclic (non-aromatic hydrocarbon) structure.

In the present invention, the non-conjugated vinylidene group-containing compound represented by General Formula (13) or (14) preferably has an additional alkenyl group in addition to the vinylidene group (non-conjugated vinylidene group). The position of the vinylidene group other than the non-conjugated vinylidene group contained in the non-conjugated vinylidene group-containing compound represented by General Formula (13) or (14) is not particularly limited. Above all, the non-conjugated vinylidene group-containing compound represented by General Formula (13) or (14) is preferably such that a vinylidene group other than the non-conjugated vinylidene group is located in the ring formed by $R^{21}$, $R^{22}$, $R^{25}$, and $R^{26}$. That is, the ring formed by $R^{21}$, $R^{22}$, $R^{25}$, and $R^{26}$ particularly preferably contains at least one unsaturated hydrocarbon ring, and more particularly preferably an unsaturated hydrocarbon ring that has only one double bond. In addition, the non-conjugated vinylidene group-containing compound is also preferably such that a vinylidene group other than the non-conjugated vinylidene group is located in the ring formed by $R^{23}$ and $R^{24}$ of General Formula (13) or is located in the portion corresponding to the cyclic structure A of General Formula (14).

The molecular weight of the non-conjugated vinylidene group-containing compound (C) is preferably 100 to 400, more preferably 120 to 350, and particularly preferably 130 to 300.

The method of obtaining the non-conjugated vinylidene group-containing compound (C) is not particularly limited, and the compound may be commercially available or may be produced by synthesis. In a case where the compound is commercially available, for example, β-caryophyllene (manufactured by Inoue Perfumery Mfg. Co., Ltd.) may be preferably used.

In a case of producing the compound by synthesis, the method for producing the non-conjugated vinylidene group-containing compound represented by General Formula (13) or (14) is not particularly limited and the compound may be synthesized by any known method. For example, in a case of synthesizing β-caryophyllene which can be preferably used in the present invention, the compound may be synthesized according to the method described in J. Am. Chem. Soc. 85, 362 (1963), Tetrahedron Lette., 24, 1885-1888 (1983), or the like.

The content of the non-conjugated vinylidene group-containing compound (C) is preferably 0.5% to 30% by mass, more preferably 1% to 25% by mass, and still more preferably 2% to 20% by mass with respect to the total mass of the curable composition.

Hydroperoxide Compound (D)

The curable composition according to the embodiment of the present invention preferably further contains a hydroperoxide compound (D). The hydroperoxide compound (D) is a peroxide and is a compound having a peroxy group. In the hydroperoxide compound (D), one oxygen atom of the peroxy group (—O—O—) is substituted with a hydrogen atom and therefore the compound contains a hydroperoxy group (—O—O—H). The hydroperoxide compound (D) having a hydroperoxy group in the molecule has an effect of promoting chain transfer during polymerization of the non-conjugated vinylidene group-containing compound (C), and further improving the controllability of the three-dimensional structure in a case where the curable composition is effective, so that the deformability can be imparted to a semi-cured product.

The method of obtaining the hydroperoxide compound (D) is not particularly limited, and the compound may be commercially available or may be produced by synthesis. In a case where the compound is commercially available, for example, PERCUMYL H-80 (manufactured by NOF Corporation) may be used.

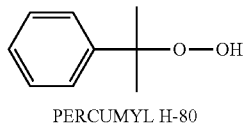

PERCUMYL H-80

The hydroperoxide compound (D) is also a compound functioning as a thermal radical polymerization initiator, but it is preferable in the present invention that the hydroperoxide compound (D) is added separately from a thermal radical polymerization initiator to be described later.

The content of the hydroperoxide compound (D) is preferably 0.01% to 10% by mass, more preferably 0.1% to 5% by mass, and still more preferably 0.2% to 2% by mass with respect to the total mass of the curable composition.

Acidic Phosphate Ester (E)

The curable composition according to the embodiment of the present invention contains an acidic phosphate ester (E) represented by General Formula (1). In addition, the acidic phosphate ester (E) is an acidic phosphate ester (E) not containing an aromatic ring, which can also be referred to as an aromatic ring-free acidic phosphate ester (E).

General Formula (1)

In General Formula (1), $R^1$ and $R^2$ may be the same as or different from each other and each independently represent a hydrogen atom or an alkyl group which may have a substituent. At least one selected from $R^1$ or $R^2$ is an alkyl group which may have a substituent.

In General Formula (1), $R^1$ and $R^2$ each independently represent a hydrogen atom or an alkyl group which may have a substituent. Examples of the substituent of the alkyl group include substitutable substituents selected from a halogen atom, a halogenated alkyl group, an alkyl group, an alkenyl group, an acyl group, a hydroxy group, a hydroxyalkyl group, an alkoxy group, an aryl group, a heteroaryl group, an alicyclic group, a cyano group, an epoxy group, an oxetanyl group, a mercapto group, an amino group, a (meth)acryloyl group, and the like. Above all, the substituent of the alkyl group is preferably an alkyl group or an alkoxy group. That is, $R^1$ and $R^2$ are each independently preferably a hydrogen atom, an alkyl group, or an alkoxyalkyl group, and at least one selected from $R^1$ or $R^2$ is preferably an alkyl group or an alkoxyalkyl group. In addition, the alkyl group may be a linear alkyl group or an alkyl group having a branched chain. In addition, the alkyl group may be a cycloalkyl group.

Specific examples of the alkyl group include alkyl groups such as ethyl, propyl, isopropyl, butyl, isobutyl, sec-butyl, tert-butyl, hexyl, octyl, 2-ethylhexyl, decyl, dodecyl, tetradecyl, hexadecyl, octadecyl, lauryl, stearyl, tetracosyl, and isotridecyl.

The number of carbon atoms in the alkyl group which may have a substituent is preferably less than 10, more preferably 9 or less, and still more preferably 8 or less. The above-mentioned number of carbon atoms includes the number of carbon atoms in the substituent in a case where the alkyl group has a substituent. In a case where the number of carbon atoms in the alkyl group which may have a substituent is set to fall within the above range, mold releasability can be controlled and continuous moldability can be enhanced. In a case where the number of carbon atoms in the alkyl group which may have a substituent is set to fall within the above range, compatibility between the acidic phosphate ester (E) and the cardo skeleton-containing monomer (A) can be enhanced. Thereby, it is possible to restrain phase separation of the acidic phosphate ester (E) during curing of the curable composition and to suppress occurrence of turbidity in the cured product to be molded, so that a cured product having high transparency can be obtained.

The content of the acidic phosphate ester (E) is preferably 0.003% to 1% by mass, more preferably 0.005% to 1% by mass, still more preferably 0.007% to 0.7% by mass, and particularly preferably 0.01% to 0.5% by mass with respect to the total mass of the curable composition. The curable composition according to the embodiment of the present invention can exhibit excellent mold transferability and continuous moldability by including a predetermined amount of the acidic phosphate ester (E) having the structure represented by General Formula (1). In addition, the curable composition according to the embodiment of the present invention has also excellent mold releasability. Further, in a case where the content of the acidic phosphate ester (E) having the structure represented by General Formula (1) is set to fall within the above range, it is possible to control the mold releasability and improve continuous moldability. In addition, by including a predetermined amount of the acidic phosphate ester (E) having the structure represented by General Formula (1), the acidic phosphate ester (E) is inhibited from phase separation during curing of the curable composition, so that a cured product with less turbidity and high transparency can be obtained.

Preferred specific examples of the acidic phosphate ester (E) represented by General Formula (1) are shown below. Incidentally, the acidic phosphate ester (E) used in the present invention is not limited to the following compounds.

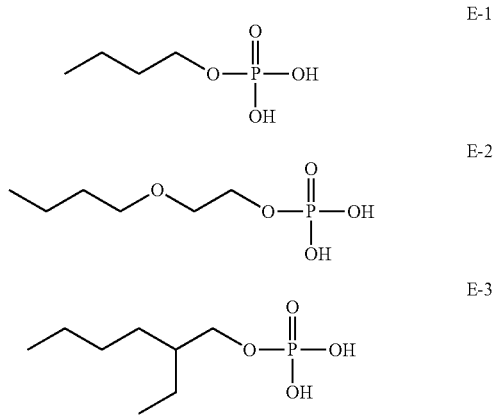

E-4

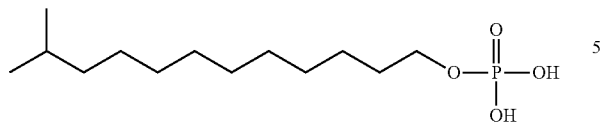

Among the above, acidic phosphate esters E-1 to E-3 are preferably used.

The method of obtaining the acidic phosphate ester represented by General Formula (1) is not particularly limited, and the compound may be commercially available or may be produced by synthesis. In a case where the compound is commercially available, for example, JP-504 (acidic phosphate ester E-1), JP-506H (acidic phosphate ester E-2), JP-508 (acidic phosphate ester E-3), and JP-513 (acidic phosphate ester E-4) (all of which are manufactured by Johoku Chemical Co., Ltd.) may be preferably used.

Aromatic Ring-Containing Acidic Phosphate Ester (F)

The curable composition according to the embodiment of the present invention preferably further contains an aromatic ring-containing acidic phosphate ester (F) represented by General Formula (2). By using the aromatic ring-containing acidic phosphate ester (F) represented by General Formula (2) in combination with the acidic phosphate ester (E) represented by General Formula (1), it is possible to further improve the continuous moldability. In the present invention, it is considered that the continuous moldability is further enhanced since the acidic phosphate ester (E) can be inhibited from accumulating in the mold by using the aromatic ring-containing acidic phosphate ester (F) represented by General Formula (2) in combination.

General Formula (2)

In General Formula (2), $Ar^1$ and $Ar^2$ may be the same as or different from each other and each independently represent a hydrogen atom or an aryl group which may have a substituent. At least one selected from $Ar^1$ or $Ar^2$ is an aryl group which may have a substituent. Above all, it is preferred that both $Ar^1$ and $Ar^2$ are aryl groups which may have a substituent.

Specific examples of the aryl group represented by $Ar^1$ and $Ar^2$ in General Formula (2) include a phenyl group, a cresyl group, and a kyrilenyl group, among which a phenyl group is preferable.

Preferred specific examples of the aromatic ring-containing acidic phosphate ester (F) represented by General Formula (2) are shown below. In addition, the aromatic ring-containing acidic phosphate ester (F) used in the present invention is not limited to the following compounds.

Aromatic Ring-Containing Acidic Phosphate Ester F-1

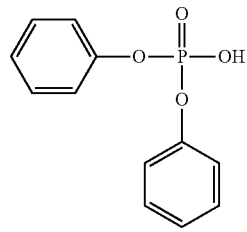 [SMILES: O=P(O)(Oc1ccccc1)Oc1ccccc1]

The method of obtaining the aromatic ring-containing acidic phosphate ester represented by General Formula (2) is not particularly limited, and the compound may be commercially available or may be produced by synthesis. In a case where the compound is commercially available, for example, diphenyl phosphate (aromatic ring-containing acidic phosphate ester F-1, manufactured by Tokyo Chemical Industry Co., Ltd.) may be preferably used.

The content of the aromatic ring-containing acidic phosphate ester (F) is preferably 0.005% to 1% by mass, more preferably 0.007% to 0.7% by mass, and still more preferably 0.01% to 0.5% by mass with respect to the total mass of the curable composition. The curable composition according to the embodiment of the present invention can exhibit superior mold transferability and continuous moldability by further including an aromatic ring-containing acidic phosphate ester (F) having the structure represented by General Formula (2).

The content of the acidic phosphate ester (E) and the content of the aromatic ring-containing acidic phosphate ester (F) are preferably 50:50 to 10:90 and more preferably 50:50 to 10:50 in terms of mass ratio. In a case where the mass ratio of the acidic phosphate ester (E) and the aromatic ring-containing acidic phosphate ester (F) is set to fall within the above range, the curable composition according to the embodiment of the present invention can exhibit superior mold transferability and continuous moldability.

Polymer (G) Having Radically Polymerizable Group in Side Chain

The curable composition according to the embodiment of the present invention may further contain a polymer (G) having a radically polymerizable group in the side chain, if necessary. The polymer (G) having a radically polymerizable group in the side chain functions to increase the viscosity of the curable composition and therefore can also be referred to as a thickener or a thickening polymer. The polymer (G) having a radically polymerizable group in the side chain may be added only in a case where it is necessary to adjust the viscosity of the curable composition within a desired range.

The polymer (G) having a radically polymerizable group in the side chain may be a homopolymer or a copolymer. Above all, the polymer (G) having a radically polymerizable group in the side chain is preferably a copolymer. In a case where the polymer (G) having a radically polymerizable group in the side chain is a copolymer, at least one of the copolymerization components may have a radically polymerizable group. In a case where the polymer (G) having a radically polymerizable group in the side chain is a copolymer, more preferred is a copolymer containing a monomer unit having a radically polymerizable group in the side chain and a monomer unit having an aryl group in the side chain.

Examples of the radically polymerizable group include an acrylate group, a (meth)acrylate group, a vinyl group, a styryl group, and an allyl group. The polymer having a radically polymerizable group in the side chain preferably contains 5% to 100% by mass, more preferably 10% to 90% by mass, and still more preferably 20% to 80% by mass of repeating units having a radically polymerizable group.

Specific examples of the polymer (G) having a radically polymerizable group in the side chain which is preferably used in the present invention are listed below, but the polymer (G) having a radically polymerizable group in the side chain has the following structure is not limited to the following structures.

In the following structural formulae. Ra and Rb each independently represent hydrogen or an alkyl group. A plurality of Ra's in one polymer may be the same as or different from one another. n represents an integer of 0 to 10, preferably 0 to 2, and more preferably 0 or 1.

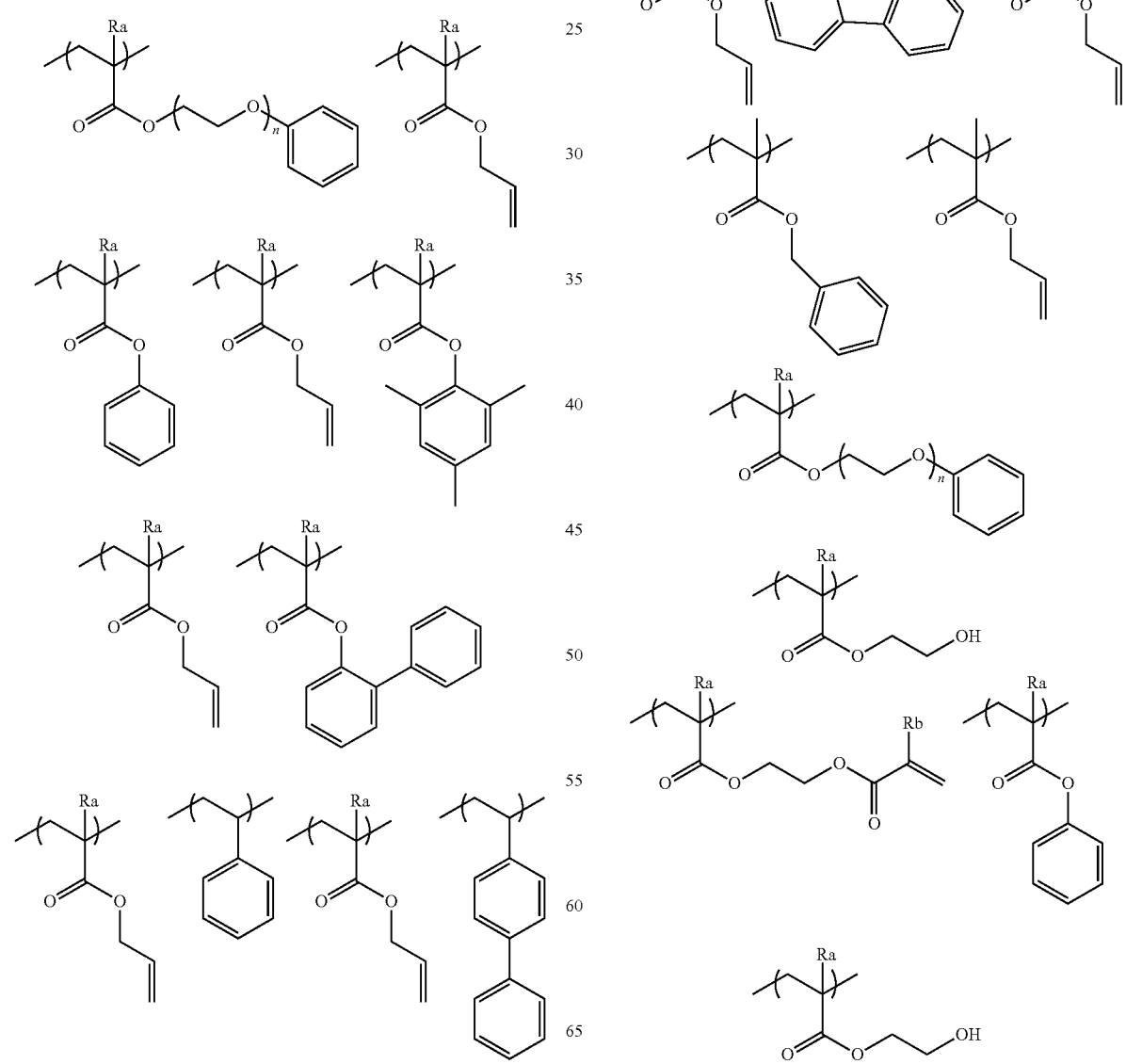

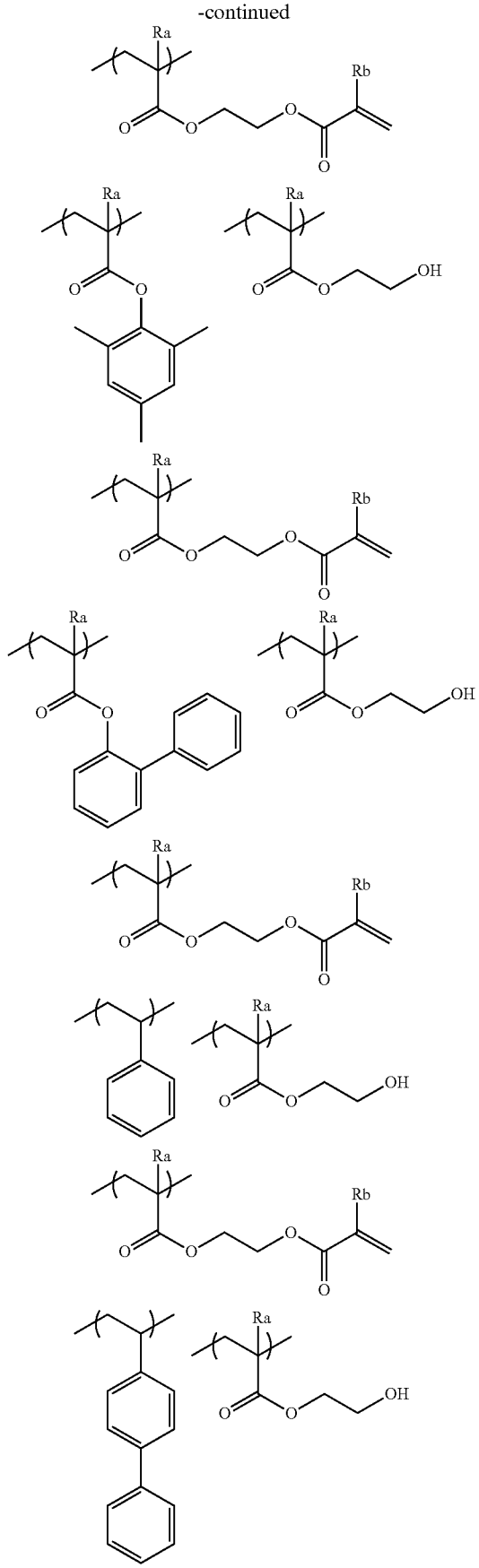
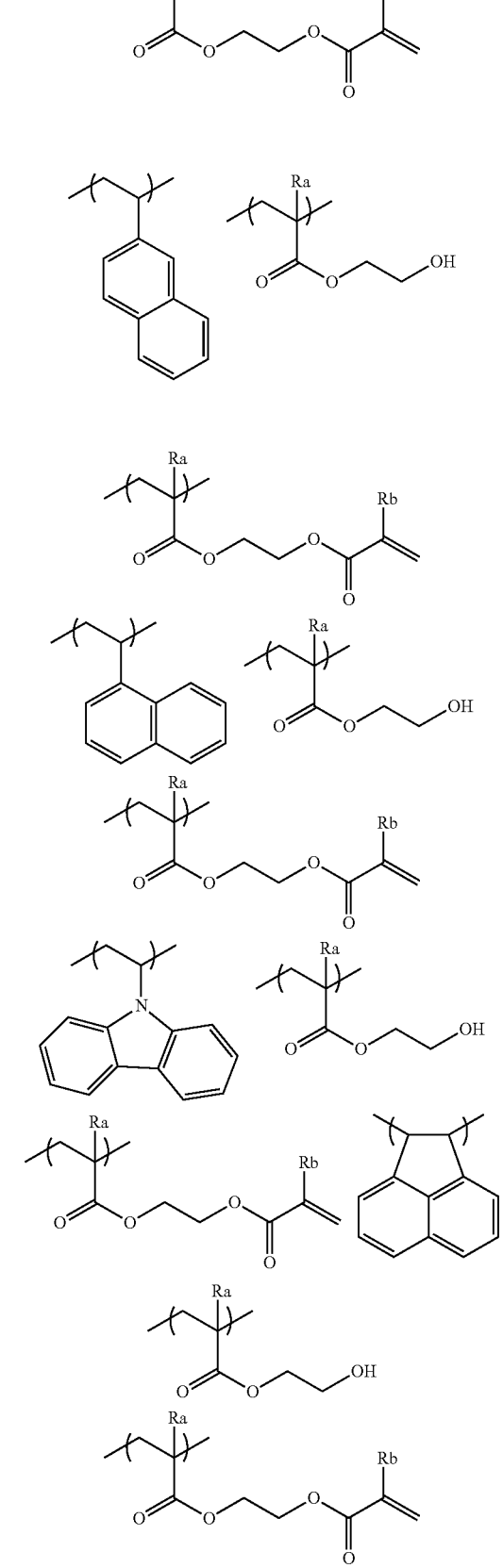

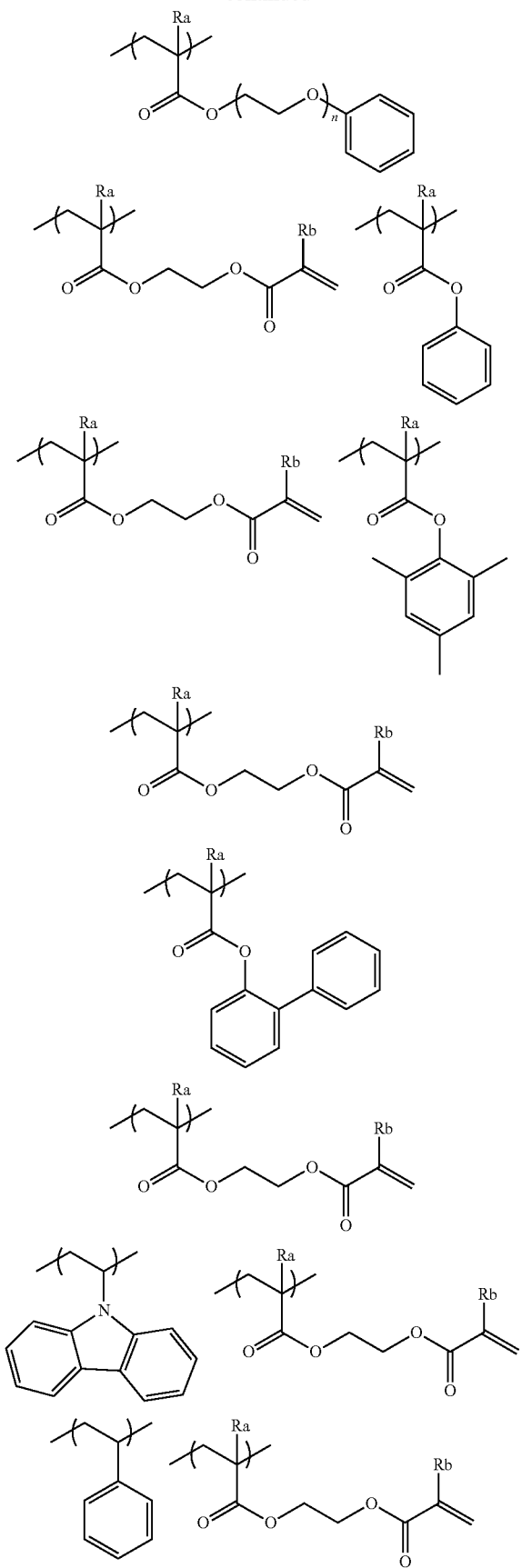

The molecular weight of the polymer (G) having a radically polymerizable group in the side chain is preferably 1,000 to 10,000,000, more preferably 5,000 to 300,000, and still more preferably 10,000 to 200,000. The glass transition temperature of the polymer (G) having a radically polymerizable group in the side chain is preferably 50° C. to 400° C., more preferably 70° C. to 350° C., and still more preferably 100° C. to 300° C.

The content of the polymer (G) having a radically polymerizable group in the side chain is preferably 40% by mass or less, more preferably 30% by mass or less, and more preferably 25% by mass or less with respect to the total mass of the curable composition. In the curable composition according to the embodiment of the present invention, the content of the cardo skeleton-containing monomer (A) is preferably 30% to 90% by mass with respect to the total mass of the curable composition, and the content of the polymer (G) having a radically polymerizable group in the side chain is preferably 0% to 40% by mass with respect to the total mass of the curable composition. The content of the polymer (G) having a radically polymerizable group in the side chain may be 0% by mass, and an aspect in which the polymer (G) having a radically polymerizable group in the side chain is not added is also preferable. In the present invention, a cured product can be molded from the curable composition, even in a case where the addition amount of the polymer (G) having a radically polymerizable group in the side chain is reduced or the polymer (G) having a radically polymerizable group in the side chain is not added at all.

Polymerization Initiator

The curable composition according to the embodiment of the present invention preferably further contains at least one selected from a thermal radical polymerization initiator or a photoradical polymerization initiator. Here, the hydroperoxide compound (D) is a thermal radical polymerization initiator, but in a case where the curable composition according to the embodiment of the present invention further contains a thermal radical polymerization initiator, it is preferable to further contain a thermal radical polymerization initiator in addition to the hydroperoxide compound (D).

Thermal Radical Polymerization Initiator (H)

The curable composition according to the embodiment of the present invention preferably contains a thermal radical polymerization initiator. Thereby, a cured product having high heat resistance can be molded by thermally polymerizing the curable composition.

Specifically, the following compounds can be used as the thermal radical polymerization initiator. Examples of the thermal radical polymerization initiator include 1,1-di(t-hexylperoxy)cyclohexane, 1,1-di(t-butylperoxy)cyclohexane, 2,2-di(4,4-di-(t-butylperoxy)cyclohexyl)propane, t-hexylperoxyisopropylmonocarbonate, t-butylperoxy-3,5,5-trimethylhexanoate, t-butylperoxy laurate, dicumyl peroxide, di-t-butyl peroxide, t-butylperoxy-2-ethylhexanoate, t-hexylperoxy-2-ethylhexanoate, cumenehydroperoxide, t-butyl hydroperoxide, and 2,3-dimethyl-2,3-diphenylbutane.

Above all, in the present invention, it is preferable to use a hydroperoxide-based thermal radical polymerization initiator having a hydroperoxy group in the molecule as the thermal radical polymerization initiator, and it is more preferable to use at least one hydroperoxide-based thermal radical polymerization initiator having a hydroperoxy group in the molecule and at least one non-hydroperoxide-based thermal radical polymerization initiator having no hydroperoxy group in the molecule.

In the present invention, PERBUTYL O (t-butylperoxy-2-ethylhexanoate, manufactured by NOF Corporation) and PERBUTYL E (t-butylperoxy-2-ethylhexyl carbonate, manufactured by NOF Corporation) can be preferably used as a non-hydroperoxide-based thermal radical polymerization initiator.

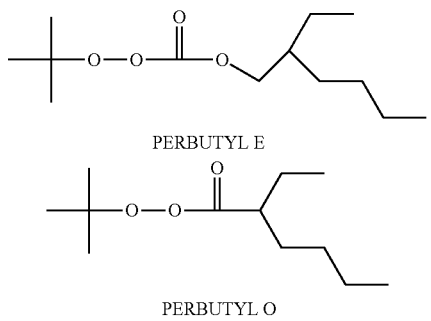

The curable composition according to the embodiment of the present invention preferably contains another thermal radical polymerization initiator apart from the hydroperoxide compound (D). It is considered preferable to contain a non-hydroperoxide-based thermal radical polymerization initiator having a low thermal polymerization initiation temperature, since the temperature at which the thermal radical polymerization is initiated is generally high in the hydroperoxide compound (D).

The content of the thermal radical polymerization initiator is preferably 0.01% to 10% by mass, more preferably 0.05% to 5.0% by mass, and still more preferably 0.05% to 2.0% by mass with respect to the total mass of the curable composition.

Photoradical Polymerization Initiator (I)

Specifically, the following compounds can be used as the photoradical polymerization initiator. Examples of the photoradical polymerization initiator include bis(2,6-dimethoxybenzoyl)-2,4,4-trimethylpentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, bis(2,6-dichlorobenzoyl)-2,4,4-trimethylpentylphosphine oxide, 1-phenyl-2-hydroxy-2-methylpropan-1-one, 1-hydroxycyclohexyl phenyl ketone, 1-(4-isopropylphenyl)-2-hydroxy-2-methylpropan-1-one, 1,2-diphenylethanedione, methylphenylglyoxylate, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2,2-dimethoxy-1,2-diphenylethan-1-one, 2-methyl-1-(4-methylthiophenyl)-2-morpholinopropan-1-one, 2-benzyl-2-dimethylamino-1-(4-morpholinophenyl)butanone-1,2,4,6-trimethylbenzoyl-diphenyl-phosphine oxide, and bis(2,4,6-trimethylbenzoyl)-phenylphosphine oxide.

Of the above, in the present invention, BASF's IRGACURE 184 (1-hydroxycyclohexyl phenyl ketone), IRGACURE 819 (bis(2,4,6-trimethylbenzoyl)-phenylphosphine oxide), IRGACURE 651 (2,2-dimethoxy-1,2-diphenylethan-1-one), 1-[4-(2-hydroxyethoxy)-phenyl]-2-hydroxy-2-methyl-1-propan-1-one, or 2-methyl-1-(4-methylthiophenyl)-2-morpholinopropan-1-one may be preferably used as the photoradical polymerization initiator.

The content of the photoradical polymerization initiator is preferably 0.01% to 5.0% by mass, more preferably 0.05% to 1.0% by mass, and still more preferably 0.05% to 0.5% by mass with respect to the total mass of the curable composition.

The curable composition preferably contains both a photoradical polymerization initiator and a thermal radical polymerization initiator. And in this case, the total content of a photoradical polymerization initiator and a thermal radical polymerization initiator is preferably 0.01% to 10% by mass, more preferably 0.05% to 5.0% by mass, and still more preferably 0.05% to 3.0% by mass with respect to the total mass of the curable composition.

Other Additives

In the present invention, unless contrary to the gist of the present invention, the curable composition may contain additives such as a polymer, a monomer, a dispersant, a plasticizer, a thermal stabilizer, and a mold release agent other than those described above.

Method for Producing Cured Product

The present invention also relates to a method for producing a cured product. The method for producing a cured product according to the embodiment of the present invention includes pressing a mold against the above-mentioned curable composition, irradiating the curable composition with light to obtain a semi-cured product, thermally curing the semi-cured product at 150° C. or higher to form a cured product, and separating the mold from the cured product in a temperature range of 150° C. to 250° C.

Transfer Step

The transfer step is a step of pressing a mold against the above-mentioned curable composition. In the transfer step, the other mold is pressed against the curable composition injected into one of a pair of molds to spread the curable composition.

It is preferred that the mold used in the method for producing a cured product is a mold subjected to a chromium nitride treatment. This makes it possible to obtain satisfactory mold releasability in a releasing step which will be carried out in a subsequent step, and it is therefore possible to enhance the production efficiency of optical parts.

For example, a method of forming a chromium nitride film on the surface of a mold can be mentioned as the chromium nitride treatment. As the method of forming a chromium nitride film on the surface of a mold, there are, for example, a chemical vapor deposition (CVD) method and a physical vapor deposition (PVD) method. The CVD method is a method of reacting a raw material gas containing chromium and a raw material gas containing nitrogen at a high temperature to form a chromium nitride film on the surface of the substrate. The PVD method is a method of forming a chromium nitride film on the surface of a substrate by using arc discharge. In this arc vacuum evaporation method, for example, a cathode made of chromium (evaporation source) is disposed in a vacuum vessel, an arc discharge is caused between the cathode and the wall surface of the vacuum vessel through a trigger to evaporate the cathode and simultaneously to ionize the metal by arc plasma, a negative voltage is applied to the substrate, and a reactive gas, for example, nitrogen gas is introduced into the vacuum vessel to about several tens of mTorr (1.33 Pa), whereby the ionized metal and the reactive gas are reacted on the surface of the substrate to form a film of the compound. The chromium nitride treatment on the surface of the mold in the present invention is carried out by the CVD method or the PVD method.

Here, in general, a mold can be heated while pressurizing the contents by combining two molds. In a case where a low-viscosity composition is injected into the mold, it will cause leakage to a mold clearance. Therefore, the curable composition preferably has a viscosity of a certain level or more. In order to adjust the viscosity of the curable composition, the above-described polymer (G) having a radically polymerizable group in the side chain may be added to the curable composition.

Step of Obtaining Semi-Cured Product

A step of obtaining a semi-cured product is provided after the step of pressing a mold. The semi-cured product is obtained by semi-curing the curable composition injected into the mold. In the step of obtaining a semi-cured product, photoirradiation or heating is carried out. In the present specification, such a step can also be referred to as a semi-curing step.

In the step of obtaining a semi-cured product, the curable composition according to the embodiment of the present invention is preferably subjected to at least one of photoirradiation or heating to form a semi-cured product having a complex viscosity of $10^5$ to $10^8$ mPa·s at 25° C. and a frequency of 10 Hz.

As used herein, the term "semi-cured product" in the present specification refers to a product obtained by polymerizing a curable composition, which is not completely solid and has fluidity to some extent. A polymer of a curable composition in such a state that its complex viscosity at 25° C. and at a frequency of 10 Hz is $10^5$ to $10^8$ mPa·s is a semi-cured product. That is, those of which the upper limit value of the complex viscosity at 25° C. and at a frequency of 10 Hz is less than $1.0 \times 10^9$ mPa·s are considered to fall within a range of semi-cured products. On the other hand, the term "cured product" refers to a product produced by polymerizing a curable composition and is in a state of being completely solid.

Semi-Curing Step

The semi-curing step preferably includes a step of photoirradiating and/or heating the curable composition to obtain a semi-cured product having a complex viscosity of $10^5$ to $10^8$ mPa·s at 25° C. and at a frequency of 10 Hz.

In the semi-curing step, the curable composition may be directly placed in a molding mold to be used in thermal polymerization, before photoirradiation and/or heating of the composition, or alternatively, the curable composition may be placed in a mold different from the molding mold for thermal polymerization to produce a semi-cured product, and then transferred to the molding mold to be used in thermal polymerization.

The photoirradiation in the semi-curing step is carried out so that the complex viscosity of the semi-cured product at 25° C. and at a frequency of 10 Hz after photoirradiation is preferably $10^5$ to $10^8$ mPa·s, more preferably $10^5$ to $10^{7.5}$ mPa·s, and particularly preferably $10^{5.5}$ to $10^{7.5}$ mPa·s.

The light used in the photoirradiation is preferably ultraviolet light or visible light and more preferably ultraviolet light. For example, a metal halide lamp, a low pressure mercury lamp, a high pressure mercury lamp, an ultrahigh pressure mercury lamp, a germicidal lamp, a xenon lamp, or a light emitting diode (LED) light source lamp is suitably used. The atmosphere during photoirradiation is preferably air or an inert gas purged atmosphere and is more preferably an atmosphere purged with nitrogen until an oxygen concentration becomes 1% or less.

In a case of providing a semi-curing step by heating in the semi-curing step, the semi-curing by heating is carried out so that the complex viscosity of the semi-cured product at 25° C. and at a frequency of 10 Hz after heating is preferably $10^5$ to $10^8$ mPa·s, more preferably $10^5$ to $10^{7.5}$ mPa·s, and particularly preferably $10^{5.5}$ to $10^{7.5}$ mPa·s.

Semi-Cured Product

The present invention may relate to a semi-cured product produced by the above-described method. Such a semi-cured product can be preferably used for a method for producing a cured product to be described later. Here, the preferred range of the complex viscosity of the semi-cured product is the same as the preferred range of the complex viscosity of the semi-cured product in the above-described step of obtaining a semi-cured product.

The semi-cured product may not contain the photoradical polymerization initiator at all after the photoirradiation step, since the initiator is completely consumed in the step, or the photoradical polymerization initiator may remain in the semi-cured product.

In addition, the glass transition temperature of the semi-cured product is preferably −150° C. to 0° C., more preferably −50° C. to 0° C., and particularly preferably −20° C. to 0° C.

Step of Forming Cured Product

The step of forming a cured product preferably includes a thermal polymerization step of putting the semi-cured product in a molding mold for pressure deforming therein, and heating it therein for thermal polymerization to obtain a cured product or a photopolymerizing step of photoirradiating the semi-cured product to obtain a cured product. In the present specification, such a step can also be referred to as a curing step. The photoirradiation conditions and the heating conditions in the step of forming a cured product are the same as those in the above-described semi-curing step.

In a case where the curing step is a thermal polymerization step, the molding mold used in the polymerization step is also referred to as a thermoforming mold. In general, the thermoforming mold is composed of two molding mold parts and is preferably designed so that contents can be heated under pressure in the combination of the two molding mold parts. In the method for producing a cured product, a mold is more preferably used as the molding mold in the thermal polymerization step to obtain a cured product. The thermoforming mold of the type for use herein is described, for example, in JP2009-126011A. In addition, the mold is preferably a mold which has been subjected to a chromium nitride treatment.

In the curing step, first, the semi-cured product produced in the semi-curing step is put into a molding mold. As described in the step of obtaining a semi-cured product, the semi-cured product after photoirradiation and/or heating is directly set in a thermoforming mold and is photoirradiated and/or heated therein, or is set in a mold different from a thermoforming mold and is photoirradiated and/or heated therein. In a case where the semi-cured product after photoirradiation is directly set in a thermoforming mold and is photoirradiated and/or heated therein, the operation of transferring the semi-cured product into a thermoforming mold is unnecessary. On the other hand, in a case where the semi-cured product after photoirradiation and/or heating is set in a mold different from a thermoforming mold and is photoirradiated and/or heated therein, it is preferred to include a step of transferring the semi-cured product into a thermoforming mold. For the method of transferring the semi-cured product after photoirradiation and/or heating into a thermoforming mold, for example, an air tweezer equipped with a syringe, a vacuum pad, and a vacuum generator may be used. The semi-cured product has a complex viscosity falling within a specific range, and therefore can be readily transferred into a thermoforming mold by the use of such an air tweezer.

In the curing step, the semi-cured product put in a molding mold is deformed under pressure and heated for thermal polymerization to obtain a cured product. Here, pressure deforming and heating may be carried out simultaneously, or heating may be carried out after pressure deforming, or pressure deforming may be carried out after heating. Above all, preferably, pressure deforming and heating are carried out simultaneously. Also preferably, after simultaneous pressure deforming and heating, the product may be further heated at a higher temperature after the pressure applied thereto has become stable.

In the curing step, the semi-cured product is cured by heating at a temperature of 150° C. or higher to obtain a cured product.

The heating temperature is 150° C. or higher, preferably 160° C. to 270° C., more preferably 165° C. to 250° C., and still more preferably 170° C. to 230° C.

In this curing step, it is preferable to carry out heating and pressure deforming. As a result, the reversed shape of the inner surface of the mold can be accurately transferred to the cured product.

Pressure deforming and heating may be carried out simultaneously, or heating may be carried out after pressure deforming, or pressure deforming may be carried out after heating, among which pressure deforming and heating are preferably carried out simultaneously. Also preferably, after simultaneous pressure deforming and heating, the product may be further heated at a higher temperature after the pressure applied thereto has become stable.

The pressure for the pressure deforming is preferably 0.098 MPa to 9.8 MPa, more preferably 0.294 MPa to 4.9 MPa, and particularly preferably 0.294 MPa to 2.94 MPa.

The time of thermal polymerization is preferably 30 to 1,000 seconds, more preferably 30 to 500 seconds, and particularly preferably 60 to 300 seconds. The atmosphere during thermal polymerization is preferably air or an inert gas purged atmosphere and more preferably an atmosphere purged with nitrogen until an oxygen concentration becomes 1% or less.

Releasing Step

In the releasing step, the mold is separated from the cured product in a temperature range of 150° C. to 250° C. In a case where the temperature in the releasing step is set to fall within the above range, it is possible to easily separate the mold from the cured product, thereby improving the production efficiency.

The heating temperature in this step is 150° C. to 250° C., preferably 160° C. to 250° C., more preferably 165° C. to 250° C., and still more preferably 170° C. to 230° C.

Although an example of the method for producing the cured product according to the embodiment of the present invention has been described above, the configuration of the present invention is not limited thereto and can be appropriately modified without departing from the spirit and scope of the present invention. For example, the mold used in the transfer step and the semi-curing step may be used directly in the curing step; or after carrying out the semi-curing step, the mold may be separated from the semi-cured product, and this semi-cured product may be transferred to another mold (thermoforming mold) to carry out a curing step. In this case, it is preferred that the mold used in the semi-curing step and the curing step is subjected to the above-mentioned chromium treatment.

In addition, in the semi-curing step, the curable composition in the mold may be subjected to photoirradiation and heating. Thereby, it is possible to reliably obtain a semi-cured product having a desired degree of curing.

Cured Product

The present invention also relates to a cured product of a curable composition. The cured product is formed by curing the above-mentioned semi-cured component. The cured product according to the embodiment of the present invention is preferably a cured product produced by the above-mentioned method for producing a cured product.

Refractive Index

The cured product according to the embodiment of the present invention preferably has a high refractive index from the viewpoint of using it for optical members, especially for lenses. The refractive index nD at a wavelength of 589 nm of the cured product according to the embodiment of the present invention is preferably 1.58 or more, more preferably 1.60 or more, and still more preferably 1.61 or more. The refractive index of the cured product at 589 nm can be measured using an Abbe meter (manufactured by Atago Co., Ltd.).

Abbe Number

The cured product according to the embodiment of the present invention can be used for lenses and the like among optical member applications. In this case, from the viewpoint of reducing chromatic aberration, the cured product preferably has a low Abbe number. The Abbe number of the cured product according to the embodiment of the present invention is preferably 35 or less, more preferably 30 or less, and still more preferably 25 or less.

In the present specification, the Abbe number (vD) is calculated from the following equation by measuring the refractive indices nD, nF, and nC at wavelengths of 589 nm, 486 nm, and 656 nm, respectively, using an Abbe refractometer (manufactured by Kalnew Optical Industry Co., Ltd.).

$$vD=(nD-1)/(nF-nC)$$

Here, nD represents a refractive index at a wavelength of 589 nm, nF represents a refractive index at a wavelength of 486 nm, and nC represents a refractive index at a wavelength of 656 nm.

Size

The maximum thickness of the cured product according to the embodiment of the present invention is preferably 0.1 to 10 mm. The maximum thickness is more preferably 0.1 to 5 mm and particularly preferably 0.15 to 3 mm. The maximum diameter of the cured product according to the embodiment of the present invention is preferably 1 to 1,000 mm. The maximum diameter is more preferably 2 to 200 mm and particularly preferably 2.5 to 100 mm.

Optical Members

The present invention also relates to an optical member including the above-mentioned cured product. Since the cured product according to the embodiment of the present invention is a molded body having excellent optical properties, it is preferably used as an optical member. The type of the optical member according to the embodiment of the present invention is not particularly limited. In particular, the cured product according to the embodiment of the present invention is suitably used for optical members that utilize the excellent optical properties of curable compositions, especially for light-transmissive optical members (so-called passive optical members). Examples of optically-functional devices equipped with such optical members include various types of display devices (a liquid crystal display, a plasma display, and the like), various types of projector devices (an overhead projector (OHP), a liquid crystal projector, and the like), optical fiber communication systems (an optical waveguide, a light amplifier, and the like), and image-taking devices such as a camera and a video.

Examples of the passive optical members for use in optically-functional devices include lenses, prisms, prism sheets, panels (plate-like molded bodies), films, optical waveguides (film-like optical waveguide, a fiber-like optical waveguide, and the like), optical discs, and LED sealants. If desired, the passive optical members may be provided with an optional coating layer, such as a protective layer for preventing mechanical damage of the coating surface by friction or abrasion, a light-absorbing layer for absorbing the light having an undesirable wavelength to cause degradation of inorganic particles, substrates and others, a blocking layer for suppressing or preventing permeation of reactive small molecules such as moisture or oxygen gas, an antiglare layer, an antireflection layer, a layer of low refractive index, or the like, as well as any additional functional layer. Specific examples of the optional coating layer include a transparent conductive film or gas barrier film formed of an inorganic oxide coating layer, and a gas barrier film or hard coating film formed of an organic coating layer. The coating method for these layers may be any known coating method such as a vacuum deposition method, a CVD method, a sputtering method, a dip coating method, or a spin coating method.

Application Examples

The optical member using the cured product according to the embodiment of the present invention is especially preferable for a lens substrate. The lens substrate produced using the curable composition according to the embodiment of the present invention has a low Abbe number and preferably has high refractivity, high light transmittance and lightweightness and exhibits excellent optical properties. By suitably adjusting the type of monomer constituting the curable composition, it is possible to control the refractive index of the lens substrate in any desired manner.

In addition, in the present specification, the "lens substrate" refers to a single member capable of exhibiting a lens function. On and around the surface of the lens substrate, any film and member may be provided depending on the use environment and applications of lenses. For example, a protective film, an antireflection film, a hard coating film, or the like may be formed on the surface of the lens substrate. Further, it can be a compound lens in which a glass lens substrate or a plastic lens substrate is laminated. It is also possible to make the periphery of the lens substrate intrude and be fixed in a substrate holding frame. However, those films and frames are additional members to the lens substrate and therefore differ from the lens substrate itself referred to in the present specification.

In a case of using the lens substrate for lenses, the lens substrate itself may be used as a lens by itself, or additional films or frames or additional lens substrates may be added thereto for use as a lens, as mentioned above. The type and the shape of the lens using the lens substrate are not particularly limited.

The lens substrate has a low Abbe number and is therefore preferably used for an achromatic lens, and the achromatic lens is used, for example, for lenses for imaging devices such as mobile phones or digital cameras; lenses for movie devices such as TV or video cameras; and lenses for in-vehicle devices or endoscope lenses.

EXAMPLES

Hereinafter, the features of the present invention will be more specifically described with reference to Examples and Comparative Examples. In the following Examples, the materials to be used, amounts and ratios thereof, the details of the treatment and the treatment procedures, and the like can be suitably modified or changed without departing from the scope of the present invention. Accordingly, the scope of the present invention should not be limitedly interpreted by the following specific Examples.

Cardo Skeleton-Containing Monomer (A)

Compound A-1

OGSOL EA-200 (manufactured by Osaka Gas Chemicals Co., Ltd.) was used as the compound A-1.

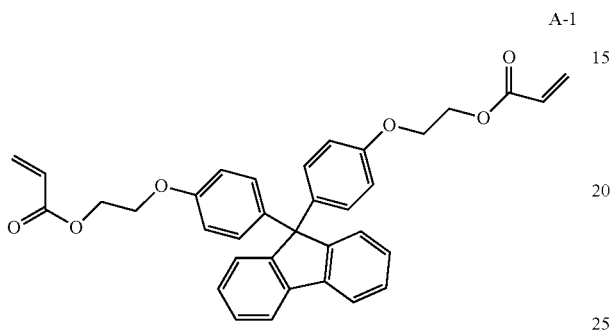
A-1

Synthesis of Compound A-2

The compound A-2 shown below was synthesized according to the synthesis method described in Example 1 of JP2014-080572A.

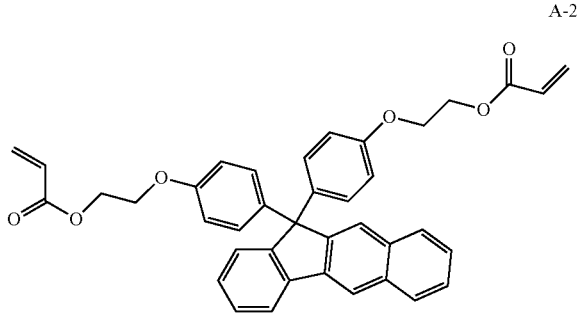 [SMILES: C=CC(=O)OCCOc1ccc(C2(c3ccc(OCCOC(=O)C=C)cc3)c3ccccc3-c3cc4ccccc4cc32)cc1]
A-2

Aromatic Ring-Containing Monofunctional (Meth)Acrylate Monomer (B)

VISCOAT #192 PEA (manufactured by Osaka Organic Chemical Industry Co., Ltd.) was used as the aromatic ring-containing monofunctional (meth)acrylate monomer B-1.

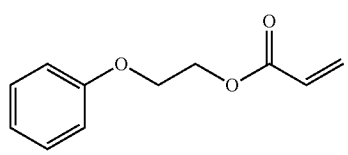
B-1

Non-Conjugated Vinylidene Group-Containing Compound (C)

β-caryophyllene (manufactured by Inoue Perfumery Mfg. Co., Ltd.) was used as the non-conjugated vinylidene group-containing compound C-1. There is no particular restriction on the optical isomers thereof.

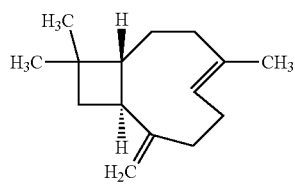
C-1

Hydroperoxide Compound (D)

PERCUMYL H-80 (manufactured by NOF Corporation) was used as the hydroperoxide compound D-1.

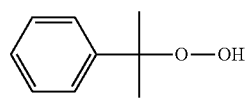
D-1

Acidic Phosphate Ester (E)

The following compounds were respectively used as the acidic phosphate ester (E).
Acidic phosphate ester E-1: JP-504 (manufactured by Johoku Chemical Co., Ltd.)
Acidic phosphate ester E-2: JP-506H (manufactured by Johoku Chemical Co., Ltd.)
Acidic phosphate ester E-3: JP-508 (manufactured by Johoku Chemical Co., Ltd.)
Acidic phosphate ester E-4: JP-513 (manufactured by Johoku Chemical Co., Ltd.)

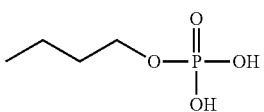
E-1

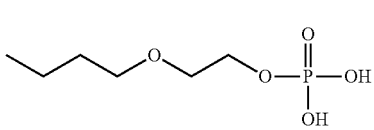
E-2

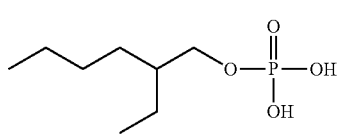
E-3

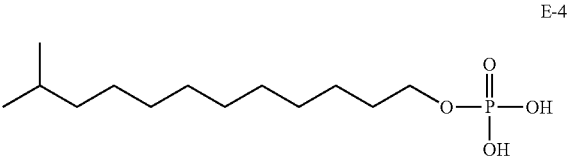
E-4

Aromatic Ring-Containing Acidic Phosphate Ester (F)

Diphenyl phosphate (manufactured by Tokyo Chemical Industry Co., Ltd.) was used as the aromatic ring-containing acidic phosphate ester F-1.

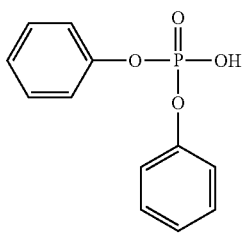

F-1

Polymer (G) Having Radically Polymerizable Group in Side Chain

Polymer G-1 having a radically polymerizable group in the side chain was synthesized by the following method.

12.0 g of benzyl methacrylate (manufactured by Osaka Organic Chemical Industry Ltd.) and 18.0 g of allyl methacrylate (manufactured by Wako Pure Chemical Industries, Ltd.) were dissolved in 172.3 g of methyl ethyl ketone, followed by heating to 70° C. A solution of 1.05 g of polymerization initiator V-65 (manufactured by Wako Pure Chemical Industries, Ltd.) dissolved in 12.0 g of methyl ethyl ketone was added dropwise over 30 minutes to the resulting solution. After completion of the dropwise addition, the reaction was further carried out at 70° C. for 4.5 hours. After allowing the reaction solution to cool, the solution was concentrated to a total amount of 107.7 g, 42.0 g of methanol was added thereto, and the mixture was stirred until it became homogeneous. The reaction solution was added dropwise to 858.0 g of methanol cooled to 5° C. or lower, and the precipitated powder was collected by filtration and dried. In this manner, 20.5 g of polymer G-1 was obtained. The obtained polymer had a weight-average molecular weight of 35700 in terms of standard polystyrene as measured by a gel permeation chromatography (GPC) method and a dispersivity (Mw/Mn) of 3.3.

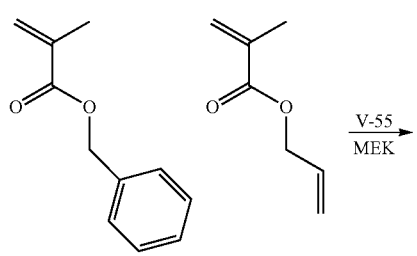

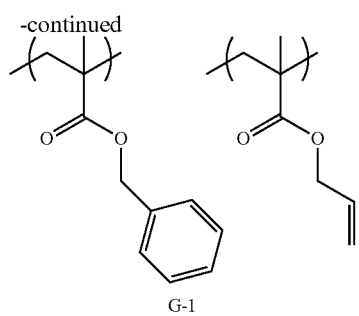

G-1

Photoradical Polymerization Initiator (I)

IRGACURE 651 (manufactured by BASF Corporation) was used as a photoradical polymerization initiator.

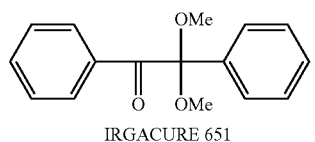 [SMILES: COC(OC)(C(=O)c1ccccc1)c1ccccc1]

IRGACURE 651

Thermal Radical Polymerization Initiator (H)

The following compounds were used as the thermal radical polymerization initiator.
PERBUTYL E (manufactured by NOF Corporation)
PERBUTYL O (manufactured by NOF Corporation)

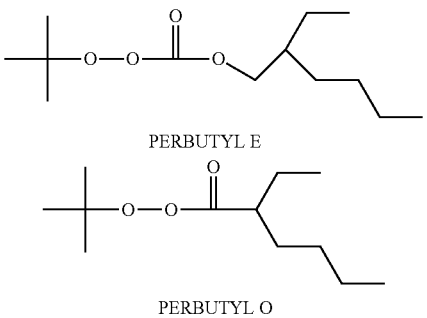

Examples 1 to 11 and Comparative Examples 1 to 4

Individual components were mixed so as to have the composition described in the following table, and the mixture was stirred to make it homogeneous to prepare a curable composition.

Evaluation

Production of Compound Lens 200 mg of each of the curable compositions obtained in Examples and Comparative Examples was injected into a molding mold whose surface was treated with chromium nitride (the surface in contact with the curable composition has an aspherical shape). Subsequently, a transparent glass lens (glass material BK-7, a convex lens of diameter: 33 mm, center thickness: 3 mm, radius of curvature of the surface in contact with the curable composition=44.3 mm, and radius of curvature of the surface not in contact with the curable composition=330.9 mm) was placed so as to cover all the surfaces of the curable composition not in contact with the molding mold, and was spread out so that the diameter of the curable composition was 30 mm. After this state, ultraviolet light of 300 mJ/cm² was irradiated from above the glass lens using an Execure 3000 (manufactured by Hoya Corporation). Then, while maintaining the state sandwiched between the molding mold and the glass lens, the temperature was raised to 200° C. while applying a pressure of 0.196 MPa (2 kgf/cm²) to the curable composition, followed by curing (a step of forming a cured product). Then, after the mold temperature was cooled to 180° C., the cured product of the curable composition and the molding mold were separated from each other at a rate of 0.05 mm/sec to produce a compound lens (a step of separating a mold). The above step was repeated 100 times to produce 100 compound lenses for use in the following evaluations.

Mold Transferability

The appearance of each compound lens produced as described above was evaluated using a digital microscope (trade name: VHX-1000, manufactured by Keyence Corporation).

Those with fine irregularities (wrinkles) on the surface of the compound lens were regarded as detective products, and those without fine irregularities (wrinkles) were regarded as non-defective products. 100 compound lenses produced were evaluated, and the percentage of non-defective products among them was taken as a non-defective rate and evaluated according to the following standards. The rank 2 or higher was taken as the acceptance level.

Rank 3: The non-defective rate was 90% or more.
Rank 2: The non-defective rate was 50% or more and less than 90%.
Rank 1: The non-defective rate was less than 50%.

Continuous Moldability

The surface shape of the cured product surface of the compound lens produced as described above was measured with UP3P-300 (manufactured by Panasonic Corporation). 100 compound lenses were evaluated and evaluated according to the following standards. The rank 2 or higher was taken as the acceptance level.

Rank 4: The variation in shape (3σ) was less than 0.3 μm.
Rank 3: The variation in shape (3σ) was 0.3 μm or more and less than 1.0 μm.
Rank 2: The variation in shape (3σ) was 1.0 μm or more and less than 2.0 μm.
Rank 1: The variation in shape (3σ) was 2.0 μm or more.

Appearance

The appearance of the compound lens produced as described above was evaluated using an optical microscope. While irradiating light from the glass lens side of the compound lens, the cured product surface was observed with an optical microscope and evaluated according to the following standards. The rank 2 or higher was taken as the acceptance level for the appearance.

Rank 3: Turbidity was hardly observed on the cured product surface.
Rank 2: Some turbidity was observed on the cured product surface.
Rank 1: Turbidity was considerably observed on the cured product surface.

Abbe Number

Each of the curable compositions obtained in Examples and Comparative Examples was cured in an atmosphere of 200° C. to obtain a cured product having a thickness of 2 mm, and then the Abbe number (vD) of the cured product was measured. The Abbe number (vD) was calculated from the following equation by measuring the refractive indices nD, nF, and nC at wavelengths of 589 nm, 486 nm, and 656 nm, respectively, using an Abbe refractometer (manufactured by Kalnew Optical Industry Co., Ltd.).

$$vD=(nD-1)/(nF-nC)$$

Here, nD represents a refractive index at a wavelength of 589 nm, nF represents a refractive index at a wavelength of 486 nm, and nC represents a refractive index at a wavelength of 656 nm.

TABLE 1

| | | | Example 1 | Example 2 | Example 3 | Example 4 | Example 5 | Example 6 | Example 7 | Example 8 | Example 9 | Example 10 | Example 11 | Comparative Example 1 | Comparative Example 2 | Comparative Example 3 | Comparative Example 4 |
|---|---|---|---|---|---|---|---|---|---|---|---|---|---|---|---|---|---|
| Cardo skeleton-containing monomer (A) | A-1 | % by mass | 43.3 | 43.3 | 43.3 | | 43.3 | 43.3 | 43.3 | 43.3 | | 43.3 | 43.3 | 43.3 | | 43.3 | 43.3 |
| | A-2 | % by mass | | | | 67 | | | | | 67 | | | | 67 | | |
| Aromatic ring-containing monofunctional (meth)acrylate monomer (B) | B-1 | % by mass | 28.9 | 28.9 | 28.9 | 26.7 | 28.9 | 27.9 | 28.9 | 28.9 | 26.7 | 28.9 | 28.8 | 28.9 | 26.7 | 28.9 | 27.4 |
| Non-conjugated vinylidene group-containing compound (C) | C-1 | % by mass | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 |
| Hydroperoxide compound (D) | D-1 | % by mass | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 |
| General Formula (1) Acidic phosphate ester (E) | E-1 | % by mass | 0.01 | | | | | | | | | | | | | | |
| | E-2 | % by mass | | 0.01 | | 0.01 | 0.005 | 1.0 | 0.01 | 0.01 | 0.01 | | 0.01 | | | 0.001 | 1.5 |
| | E-3 | % by mass | | | 0.01 | | | | | | | | | | | | |
| | E-4 | % by mass | | | | | | | | | | 0.01 | | | | | |
| General Formula (2) Aromatic ring-containing acidic phosphate ester (F) | F-1 | % by mass | | | | | | | 0.01 | 0.02 | 0.01 | | 0.1 | | | 0.001 | |
| General Formula (3) Polymer (G) | G-1 | % by mass | 21.5 | 21.5 | 21.5 | | 21.5 | 21.5 | 21.5 | 21.5 | | 21.5 | 21.5 | 21.5 | | 21.5 | 21.5 |
| Thermal radical polymerization initiator (H) | PERBUTYL O | % by mass | 1 | 1 | 1 | | 1 | 1 | 1 | 1 | 1 | 1 | 1 | 1 | | 1 | 1 |
| | PERBUTYL E | % by mass | | | | 1 | | | | | | | | | 1 | | |
| Photoradical polymerization initiator (I) | IRGACURE 651 | % by mass | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| (E)/(F) | | — | 100/0 | 100/0 | 100/0 | 100/0 | 100/0 | 100/0 | 50/50 | 33/67 | 50/50 | 100/0 | 9/91 | — | — | 100/0 | 100/0 |
| Mold transferability | | — | 3 | 3 | 3 | 3 | 3 | 3 | 3 | 3 | 3 | 3 | 2 | 1 | 1 | 1 | 2 |
| Continuous moldability | | — | 3 | 3 | 3 | 3 | 3 | 2 | 4 | 4 | 4 | 2 | 3 | 3 | 3 | 3 | 1 |
| Appearance (transparency) | | — | 3 | 3 | 3 | 3 | 3 | 3 | 3 | 3 | 3 | 3 | 3 | 3 | 3 | 3 | 3 |
| Abbe number | | — | 31.1 | 31.1 | 31.1 | 23.5 | 31.1 | 31.1 | 31.1 | 31.1 | 23.5 | 31.1 | 31.1 | 31.1 | 23.5 | 31.1 | 31.1 |

As can be seen from Table 1, the curable compositions of Examples had both excellent mold transferability and excellent continuous moldability. In addition, continuous moldability and appearance (transparency) could be enhanced in a case where the structure and addition amount of the acidic phosphate ester (E) are set to fall within a preferred range. Further, continuous moldability could be further enhanced by adding a predetermined amount of aromatic ring-containing acidic phosphate ester (F).

In Comparative Examples 1 and 2, the mold transferability was evaluated as poor, but the continuous moldability was evaluated as good. This is because the degree of variations in shape is evaluated in the evaluation of continuous moldability. In a case of molding one in which fine irregularities (wrinkles) occurred as in Comparative Examples 1 and 2, the one in which fine irregularities (wrinkles) occurred is stably molded, and thus evaluation of continuous moldability is improved.

What is claimed is:

1. A curable composition comprising:
    a cardo skeleton-containing monomer having two or more (meth)acryloyl groups in a molecule;
    an aromatic ring-containing monofunctional (meth)acrylate monomer;
    a polymer having a radically polymerizable group in a side chain; and
    an acidic phosphate ester,
    wherein the content of the cardo skeleton-containing monomer is 30% to 90% by mass with respect to the total mass of the curable composition,
    the content of the polymer is from greater than 0% to 40% by mass with respect to the total mass of the curable composition,
    the acidic phosphate ester is a compound represented by General Formula (1), and
    the content of the acidic phosphate ester is 0.003% to 1% by mass with respect to a total mass of the curable composition;

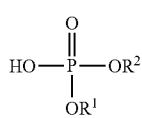

General Formula (1)

in General Formula (1), $R^1$ and $R^2$ may be the same as or different from each other and each independently represent a hydrogen atom or an alkyl group which may have a substituent; and at least one selected from $R^1$ or $R^2$ is an alkyl group which may have a substituent.

2. The curable composition according to claim 1, further comprising:
    at least one initiator selected from the group consisting of a thermal radical polymerization initiator and a photoradical polymerization initiator.

3. The curable composition according to claim 1, further comprising:
    a hydroperoxide compound.

4. The curable composition according to claim 1, further comprising:
    a non-conjugated vinylidene group-containing compound.

5. The curable composition according to claim 1, further comprising:
    an aromatic ring-containing acidic phosphate ester represented by General Formula (2);

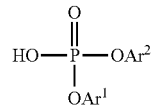

General Formula (2)

in General Formula (2), $Ar^1$ and $Ar^2$ may be the same as or different from each other and each independently represent a hydrogen atom or an aryl group which may have a substituent; and at least one selected from $Ar^1$ or $Ar^2$ is an aryl group which may have a substituent.

6. The curable composition according to claim 5, wherein the content of the acidic phosphate ester and the content of the aromatic ring-containing acidic phosphate ester are 50:50 to 10:90 in terms of mass ratio.

7. The curable composition according to claim 1, wherein, in General Formula (1), the alkyl group which may have a substituent has less than 10 carbon atoms.

8. The curable composition according to claim 7, further comprising:
    an aromatic ring-containing acidic phosphate ester represented by General Formula (2);

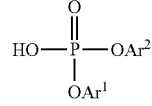

General Formula (2)

in General Formula (2), $Ar^1$ and $Ar^2$ may be the same as or different from each other and each independently represent a hydrogen atom or an aryl group which may have a substituent; and at least one selected from $Ar^1$ or $Ar^2$ is an aryl group which may have a substituent.

9. The curable composition according to claim 8, wherein the content of the acidic phosphate ester and the content of the aromatic ring-containing acidic phosphate ester are 50:50 to 10:90 in terms of mass ratio.

10. A cured product of the curable composition according to claim 1.

11. An optical member comprising:
    the cured product according to claim 10.

12. A lens comprising:
    the cured product according to claim 10.

13. A method for producing a cured product, the method comprising in order:
    pressing a mold against the curable composition according to claim 1;
    irradiating the curable composition with light to obtain a semi-cured product;
    thermally curing the semi-cured product at a temperature of 150° C. or higher to form a cured product; and
    separating the mold from the cured product in a temperature range of 150° C. to 250° C.

14. The method for producing a cured product according to claim 13,
    wherein the mold is subjected to a chromium nitride treatment.

* * * * *